United States Patent
Rosati

(10) Patent No.: US 11,554,882 B2
(45) Date of Patent: Jan. 17, 2023

(54) ATTITUDE CONTROL AND THRUST BOOSTING SYSTEM AND METHOD FOR SPACE LAUNCHERS

(71) Applicant: AVIO S.P.A., Rome (IT)

(72) Inventor: Roberto Rosati, Rome (IT)

(73) Assignee: AVIO S.P.A., Rome (IT)

( * ) Notice: Subject to any disclaimer, the term of this patent is extended or adjusted under 35 U.S.C. 154(b) by 228 days.

(21) Appl. No.: 16/620,249

(22) PCT Filed: Jun. 7, 2018

(86) PCT No.: PCT/IB2018/054092
§ 371 (c)(1),
(2) Date: Dec. 6, 2019

(87) PCT Pub. No.: WO2018/224998
PCT Pub. Date: Dec. 13, 2018

(65) Prior Publication Data
US 2021/0147099 A1 May 20, 2021

(30) Foreign Application Priority Data
Jun. 8, 2017 (IT) .................. 102017000063102

(51) Int. Cl.
*B64G 1/40* (2006.01)
*F02K 9/97* (2006.01)
(Continued)

(52) U.S. Cl.
CPC .............. *B64G 1/401* (2013.01); *F02K 9/86* (2013.01); *F02K 9/97* (2013.01); *B64G 1/002* (2013.01);
(Continued)

(58) Field of Classification Search
CPC ..... F02K 9/80; F02K 9/84; F02K 9/86; F02K 9/90; F02K 9/97; F02K 9/976; F02K 1/805; B64G 1/002
See application file for complete search history.

(56) References Cited

U.S. PATENT DOCUMENTS 3,229,457 A * 1/1966 Rowe .................. F02K 9/976
239/265.37
3,304,722 A * 2/1967 Culpepper .............. F02K 9/972
60/233
(Continued)

FOREIGN PATENT DOCUMENTS

| CN | 106 593 696 A | 4/2017 |
| FR | 2015/011198 A | 1/2015 |

(Continued)

OTHER PUBLICATIONS

Benson, Tom, Nozzle Design, Jan. 18, 2008 (Year: 2008).*
Wikipedia, ST-124-M3 inertial platform, Apr. 25, 2012 (Year: 2012).*

*Primary Examiner* — Todd E Manahan
*Assistant Examiner* — Kyle Robert Thomas
(74) *Attorney, Agent, or Firm* — McGlew and Tuttle, P.C.

(57) ABSTRACT

An attitude control and thrust boosting system (100) for a space launcher is disclosed, wherein the space launcher is equipped with a rocket engine (303) provided with an exhaust nozzle. The exhaust nozzle comprises a divergent portion (302) so designed as to make a supersonic gas flow exit through an exit section defined by a given angle of divergence with respect to a longitudinal axis of the rocket engine. The attitude control and thrust boosting system (100) comprises flaps (110, 111, 112, 113) that are arranged around the exit section, are shaped so as to extend the divergent portion of the exhaust nozzle, are mechanically decoupled from said exhaust nozzle and can be actuated to take (Continued)

different angular positions with respect to the longitudinal axis of the rocket engine. Control means (130) are also provided to receive quantities indicative of an actual attitude of the space launcher and an ambient static pressure, and to make the flaps (110,111,112,113) take a neutral angular position where the flaps (110,111,112,113) are inclined, with respect to the longitudinal axis of the rocket engine, according to an inclination angle greater than, or equal to, the given angle of divergence, in order to control the neutral angular position taken by the flaps (110,111,112,113) according to the ambient static pressure and to make one or more flaps (110,111,112,113) take an angular position different than the neutral angular position according to the actual attitude of the space launcher and to a required attitude for said space launcher.

21 Claims, 17 Drawing Sheets

(51) Int. Cl.
*F02K 9/86* (2006.01)
*B64G 1/00* (2006.01)
*F02K 1/80* (2006.01)

(52) U.S. Cl.
CPC .............. *B64G 1/404* (2013.01); *F02K 1/805* (2013.01); *F05D 2220/80* (2013.01)

(56) References Cited

U.S. PATENT DOCUMENTS

| 10,316,796 B2 * | 6/2019 | Dutheil | F02K 9/978 |
| 2002/0079404 A1 * | 6/2002 | Schroeder | F42B 10/665 |
| | | | 244/3.3 |
| 2010/0320329 A1 * | 12/2010 | Boelitz | B64G 1/62 |
| | | | 244/158.9 |
| 2016/0177875 A1 | 6/2016 | Dutheil | |

FOREIGN PATENT DOCUMENTS

| JP | H02 99751 A | 4/1990 | |
| JP | H06 257512 A | 9/1994 | |
| WO | 02/092988 A1 | 11/2002 | |
| WO | 2015/011198 A1 | 1/2015 | |
| WO | WO-2015011198 A1 * | 1/2015 | ............... F02K 9/97 |

* cited by examiner

FIG.9
| Traditional launcher | Launcher equipped with the invention |
|---|---|
| 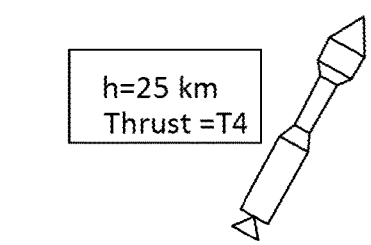 h=25 km<br>Thrust =T4 | 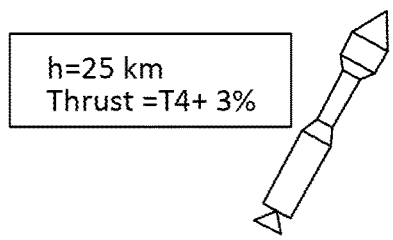 h=25 km<br>Thrust =T4+ 3% |
| 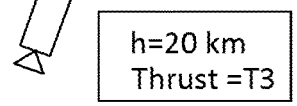 h=20 km<br>Thrust =T3 | 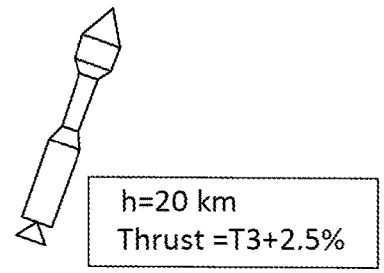 h=20 km<br>Thrust =T3+2.5% |
| 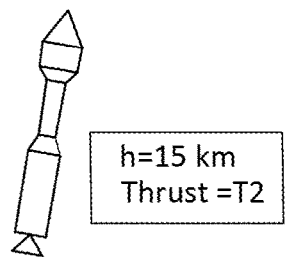 h=15 km<br>Thrust =T2 | 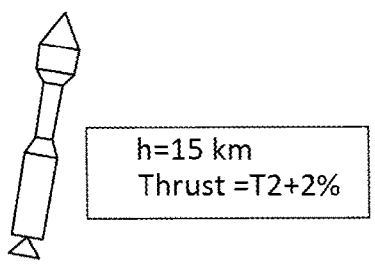 h=15 km<br>Thrust =T2+2% |
| 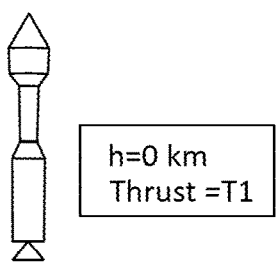 h=0 km<br>Thrust =T1 | 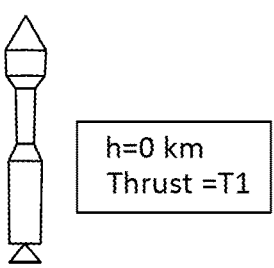 h=0 km<br>Thrust =T1 |

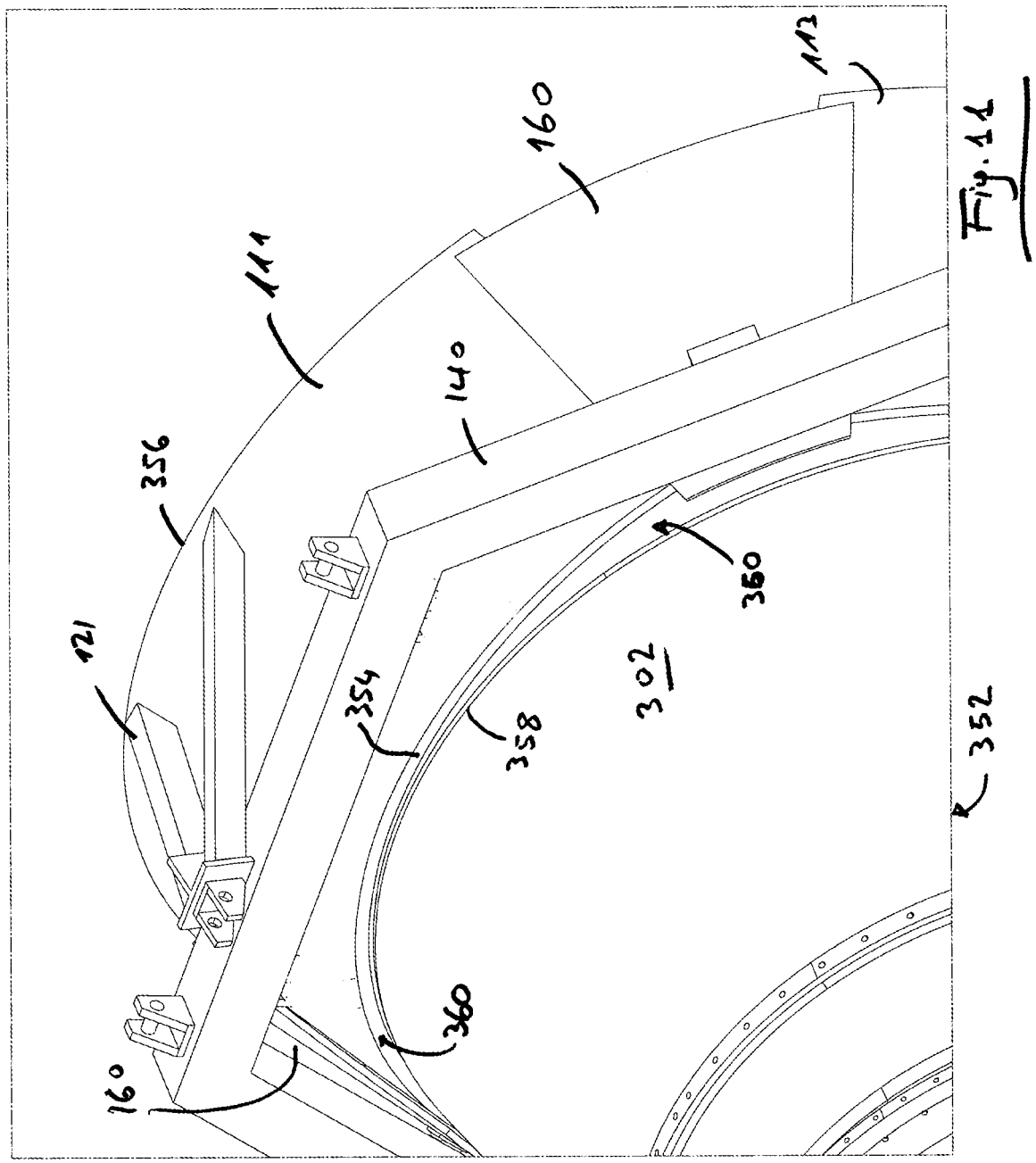

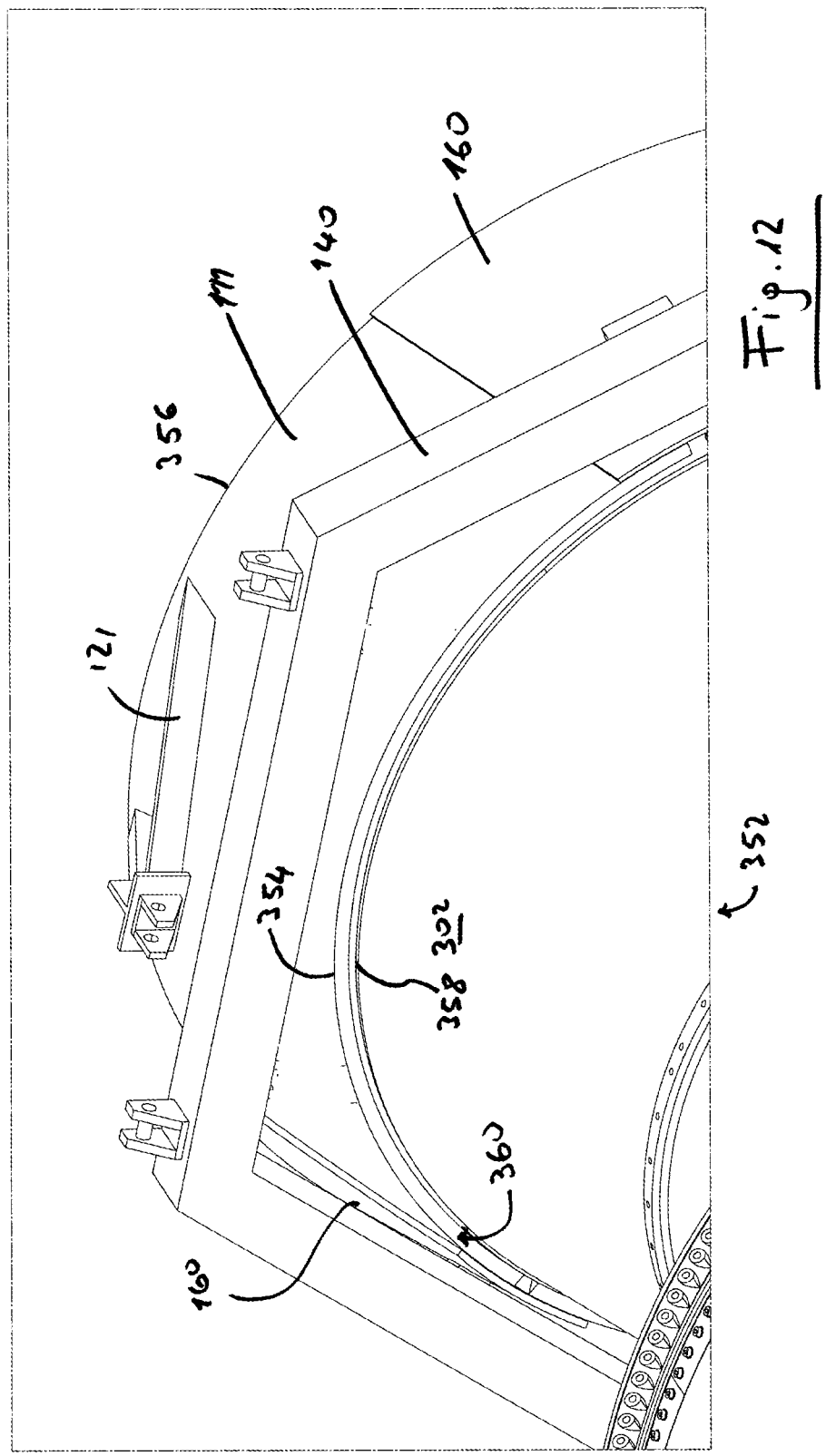

ATTITUDE CONTROL AND THRUST BOOSTING SYSTEM AND METHOD FOR SPACE LAUNCHERS

TECHNICAL FIELD

The present invention relates to space launchers. Embodiments described herein especially relate to an attitude control and thrust boosting system and method for space launchers, in particular for one or more stages of a multi-stage space launcher.

STATE OF THE ART

As it is well known, the almost universally used mechanism for controlling the attitude of a space launcher is currently that of varying the thrust direction of the rocket engine of the launcher by deflecting the exhaust nozzle of the engine (a system also known as TVC-thrust launcher control), so as to produce a force component orthogonal to the axis of the launcher, which in turn generates a control torque, which is a function of the distance between the engine thrust axis and the center of gravity of the launcher.

A typical TVC system uses, in particular, two linear actuators that are coupled to the exhaust nozzle of the rocket engine, are arranged on planes orthogonal to each other, and are so actuated as to deflect said nozzle so as to vary the thrust direction, thus generating the control torque.

Conventional TVC systems have the technical disadvantages described below.

In the case of solid-propellant rocket motors (SRMs) or of Hybrid-propellant Rocket engines (HREs), the nozzle shall be provided with a flexible joint, manufacturing whereof is quite complex and which has therefore a quite high cost; moreover, the mechanical features of the single units produced may differ also significantly from the nominal value of the technical specification.

In the case of liquid-propellant Rocket Engines (LREs), the unit "nozzle/combustion chamber" shall be provided with a universal joint ("gimbal"), in this case again with an increase in complexity, weight and cost of the launcher system.

The structural engineering of the nozzle shall take into account the loads produced by the actuators while the nozzle is deflected.

In the larger engine, the nozzle movable mass may be in the order of several hundreds kilograms, that results in high inertial value of the load applied to the TVC system, significantly limiting the dynamic features thereof (for example step command response, frequency band, etc.).

Moreover, the conventional TVC systems are also subjected to a non-stationary phenomenon of gas dynamics nature, the so-called impulse load, occurring during the ignition transient of a rocket engine. This phenomenon occurs in the divergent portion of the nozzle few thousandths of a second after engine ignition (before the flow in said divergent portion is completely supersonic), and is characterized by the occurrence of strong shock waves and discontinuity in gas efflux, which in turn induce significant impulsive loads onto the set "nozzle/actuators" of the above mentioned conventional TVC systems.

FR-A-2015/011198 discloses a combustion gas discharge device for a rocket engine, wherein around a stationary nozzle, i.e. a nozzle that is fixed with respect to the aircraft on which it is installed, flaps are provided that are angularly movable and define an extension of the nozzle. The flaps are arranged in two series, one inner series and one outer series, in order to provide a substantially continuous wall without spaces, through which the combustion gas could laterally escape. Each flap of each series of overlapped flaps is provided with a respective actuator to move the flap angularly. The arrangement is very complex and expensive. FR-A-2015/011198 generically mentions the fact that the angular arrangement of the flaps can be modified according to the flight condition and level, but no practical teaching is given on how to control the flaps. The only thing mentioned is that the position of the flaps may be such as to form a cylindrical or conical convergent prolongation of the fixed nozzle. Practically, even if in very general terms, it is suggested that the flaps take a convergent inclination with respect to the opening of the nozzle.

SUMMARY OF THE INVENTION

A first object of the invention is to provide an attitude control system for space launchers, which does not have the technical disadvantages mentioned above of the current conventional TVC systems.

A second object of the invention is to provide an attitude control system that, in addition to control the thrust direction of a rocket engine of a space launcher, is also able to increase the thrust thereof at flight height above the engine ignition height.

These and other objects are achieved through the present invention as it relates to an attitude control and thrust boosting system, according to what defined in the attached claims.

In particular, the attitude control and thrust boosting system according to the invention is so designed as to be installed on a space launcher equipped with a rocket engine provided with an exhaust nozzle that does not require to be deflected as in the traditional TVC systems, but is fixed, with the longitudinal axis thereof matching the longitudinal axis of the rocket engine; wherein said exhaust nozzle comprises a divergent portion so designed as to make a supersonic gas flow exit through an exit section defined by a given angle of divergence with respect to the longitudinal axis of the rocket engine.

The attitude control and thrust boosting system is characterized by comprising a plurality of flaps that are arranged around the exit section, are shaped so as to extend the divergent portion of the exhaust nozzle, are mechanically decoupled from said exhaust nozzle and can be actuated to take different angular positions with respect to the longitudinal axis of the rocket engine. The system further comprises control means configured for: (a) receiving quantities indicative of an actual attitude of the space launcher and an ambient static pressure; (b) making the flaps take a neutral angular position where the flaps are inclined, with respect to the longitudinal axis of the rocket engine, according to an inclination angle greater than, or equal to, the given angle of divergence; (c) controlling the neutral angular position taken by the flaps according to the ambient static pressure; (d) making one or more flaps take an angular position different than the neutral angular position according to the actual attitude of the space launcher and to a required attitude for said space launcher.

BRIEF DESCRIPTION OF THE DRAWINGS

For better understanding the present invention, some preferred embodiments will be illustrated below with reference to the accompanying drawing, just by way of non-limiting example. In the drawing (not to scale):

FIG. 9 shows an example of thrust boosting that can be obtained with the present invention;

FIGS. 11 and 12 show axonometric vies, from the side of the body of the launcher, of the exhaust nozzle and of the flaps, in two different angular positions of the flaps;

DETAILED DESCRIPTION OF EMBODIMENTS

Figure 1:
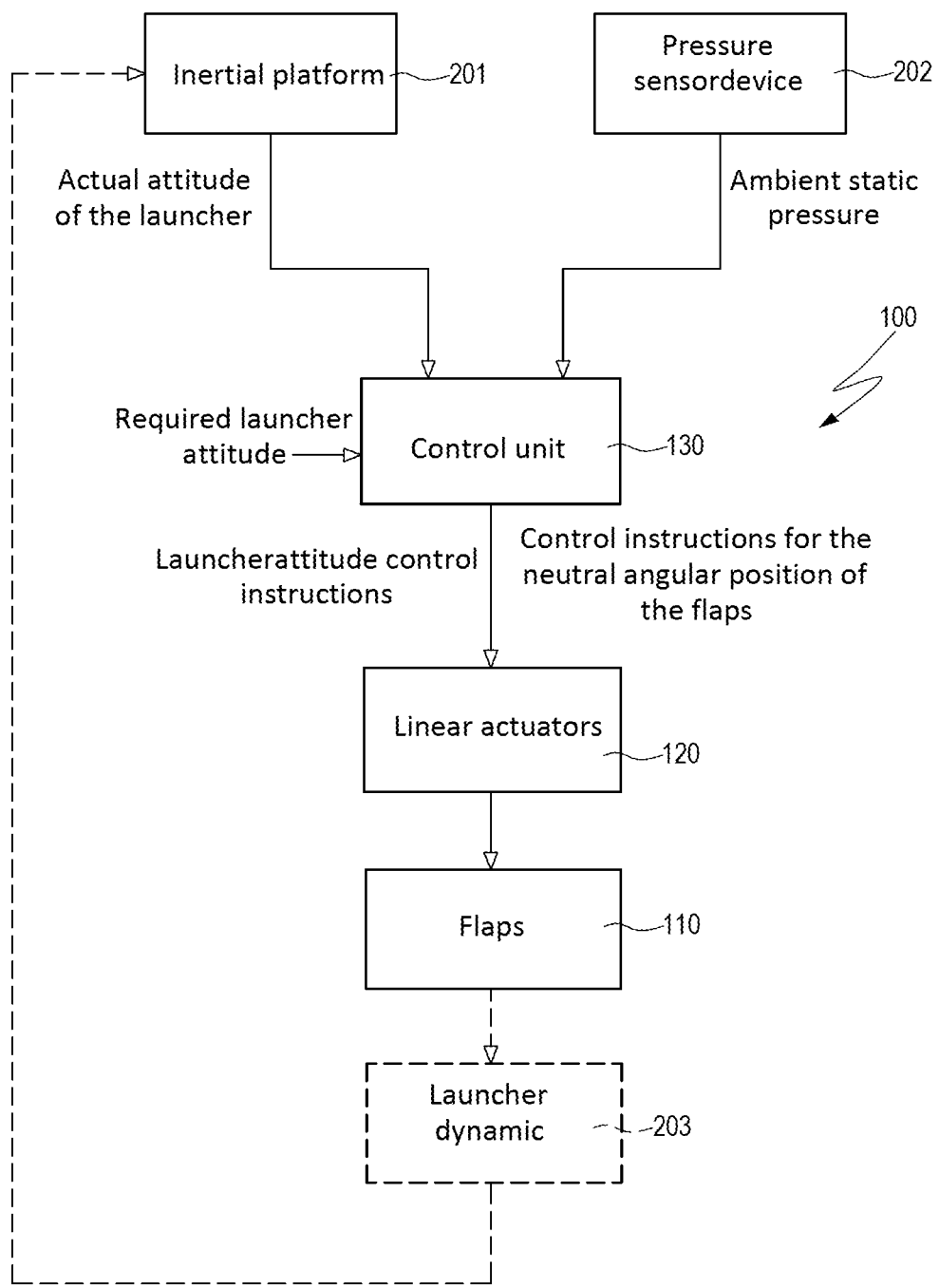
FIG. 1 schematically shows an attitude control and thrust boosting system according to an embodiment of the present invention, and, at the same time, also a respective operation logics.

The description below is provided to allow a person skilled in the art to work and use the invention. Modifications to the embodiments described herein will be immediately apparent to those skilled in the art and the generic principles disclosed herein can be also applied to other embodiments and applications without however departing from the protective scope of the invention as defined in the attached claims.

Therefore, the present invention is not limited to the embodiments described and illustrated herein; on the contrary, the scope of protection of the invention covers the principles and the features illustrated herein and defined in the attached claims.

An innovative aspect described herein is the use of a plurality of flaps (i.e. movable surfaces able to deflect fluid flows), preferably jet flaps, arranged in correspondence of an exit section of a divergent portion of an exhaust nozzle (for example a convergent-divergent nozzle, i.e. a de Laval nozzle) of a rocket engine of a stage of a multi-stage space launcher, wherein the flaps have a double function, i.e. they allow to control the attitude of the launcher and to augment the thrust of the engine at flight heights above the ignition height.

In particular, in embodiments described herein, the attitude control mechanism is based on the use of a number N (where N>3, preferably N=3) of flaps that are mechanically decoupled from the nozzle of the engine, which is kept fixed. The flaps are arranged in correspondence of the exit section of the nozzle and, when necessary, they are suitably inclined, singularly or in groups of M flaps (conveniently with M>2) so as to partially deflect the supersonic gas flow exiting from the exit section of the nozzle, thus creating a control torque.

Therefore, this attitude control mechanism is devoid of mechanical interface with the nozzle of the rocket engine.

Moreover, the attitude control mechanism described herein can synergistically combine the function of launcher attitude control with a function of thrust boosting and therefore of specific impulse of the engine for given flight phases, in an extremely advantageous manner for the low stages of a multi-stage launcher, in particular for the first stage.

In fact, the nozzles of the engines of the low stages of a multi-stage launcher have a relatively low expansion ratio due to the fact that the lower the flight height, the higher the ambient static pressure and consequently the lower shall be the expansion ratio of the nozzle to avoid the known phenomenon of over-expansion of the supersonic gas flow, with the consequent formation of shock waves and detachment of the limit layer from the inner walls of the divergent portion of the nozzle, which in turn cause a significant decrease in the engine thrust, as well as a malfunction and an irregular operation of the nozzle.

In particular, as it is well known, the expansion ratio of a convergent-divergent nozzle of a rocket engine is defined as the ratio between the total pressure at the nozzle throat (practically matching the average static pressure in the combustion chamber of the engine) and the static pressure at the exit section of the nozzle. This ratio, under conditions of supersonic flow in the divergent portion (sonic conditions in the nozzle throat) varies in homologous way (though non-linear) with the ratio of areas of the nozzle, i.e. the ratio between the area of the exit section of the nozzle and the area of the nozzle throat.

Conveniently, the flaps are so shaped as to represent, ideally, an extension of the divergent portion of the nozzle, thus allowing to have an increase in the expansion ratio of the nozzle at flight heights above the engine ignition height, with a consequent thrust and specific pulse boosting, as will be better described below.

Before describing specific embodiments of the invention, it is important to note that herein the term "neutral angular position" of the flaps means a position, which varies according to the ambient static pressure, i.e. to the flight height, as explained below, and in correspondence of which the flaps do not interfere in a counter-productive way with the expansion of the supersonic gas flow exiting from the nozzle.

In particular, in use, the flaps are so controlled as to take this neutral angular position (so as not to negatively interfere with the expansion of the supersonic gas flow exiting from the nozzle) when it is not necessary to deflect the supersonic flow, i.e., as it will be better described below, in absence of a deflection command for the attitude control of the launcher.

As, given an angular position of the flaps, the above-mentioned interference between the expansion of the supersonic gas flow exiting the nozzle and the flaps decreases as the ambient outer pressure decreases, and therefore, as the flight height increases, also the neutral angular position of the flaps varies according to the flight height.

In this regard, two main operational modes can be conveniently identified, i.e.: a type 1 operational mode implemented at low flight heights; and a type 2 operational mode implemented at high flight heights.

In particular, in type 1 operational mode, the neutral angular position corresponds, at the beginning, to an inclination of the flaps, with respect to the engine axis, greater than a preset reference angular position defined by the angle of divergence of the longitudinal profile of the nozzle at the exit section of said nozzle. In other words, the preset reference angular position is defined by the angle of divergence, with respect to the longitudinal axis of the rocket engine, characterizing the exit section of the nozzle.

In this way, in the initial step of engine operation, at low flight heights, it is possible to avoid the over-expansion of the supersonic gas flow exiting the nozzle, that is due to the relatively high values of the ambient static pressure at these heights.

Moreover, in the type 1 operational mode, the neutral angular position is varied gradually as the flight height increases, i.e. as the ambient static pressure decreases, up to tend to the preset reference angular position. More in particular, the corresponding inclination of the flaps with respect to the engine axis is gradually decreased. In this type 1 operational mode, as the flight height increases the thrust and specific pulse increases, the pulse being maximal when the flaps achieve the preset reference angular position.

In the type 2 operational mode, the neutral angular position substantially corresponds to the preset reference angular position, so as to have the maximal increase in thrust and specific pulse at high flight heights.

For a better understanding of the present invention, FIG. 1 shows a functional block diagram and the related operational logics of an attitude control and thrust boosting system 100 according to a non-limiting embodiment.

In detail, the attitude control and thrust boosting system 100 is installed on a space launcher, preferably on a stage, for instance the first stage, of a multi-stage space launcher. The space launcher, or a stage thereof, is equipped with a rocket engine. The rocket engine may be, for instance, a solid-propellant rocket engine, a liquid-propellant rocket engine or a hybrid-propellant rocket engine. The rocket engine is provided with an exhaust nozzle. The exhaust nozzle comprises a divergent portion that is so designed as to make a supersonic gas flow exit through an exit section defined by a given angle of divergence with a longitudinal axis of the rocket engine. The longitudinal axis of the rocket engine is a central axis of symmetry of the exhaust nozzle and of the rocket engine. The exit section of the nozzle lies on a plane perpendicular to the longitudinal axis of the rocket engine.

The attitude control and thrust boosting system 100 includes a number N of flaps 110, for example jet flaps. As indicated above, the number N is equal to, or greater than, three, and preferably N=3. The flaps 110 are arranged at the exit section of the nozzle and around it. Moreover, the nozzles are so shaped as to extend the divergent portion of the exhaust nozzle. As it will be described in greater detail below, the flaps are mechanically decoupled from the exhaust nozzle. Moreover, the flaps can be actuated in order to take different angular positions with respect to the longitudinal axis of the rocket engine, according to criteria that will be described in greater detail below.

Preferably and conveniently, the flaps 110 are shaped and modeled on a curved surface ideally representing an extension of the divergent portion of the nozzle.

Moreover, the attitude control and thrust boosting system 100 conveniently includes also a number N of actuators 120. Preferably, the actuators 120 are linear actuators. Each actuator is coupled to a respective flap 110. Each actuator is controllable so as to make the respective flap 110 take different angular positions with respect to the longitudinal axis of the rocket engine.

Lastly, the attitude control and thrust boosting system 100 also includes a control unit 130 connected to the linear actuators 120 to control the operation thereof. The control unit 130 is also connected to an inertial platform 201 installed on the space launcher and configured to detect an actual (i.e. effective) attitude of the launcher and to send one or more (analogical or digital) output signals carrying one or more quantities indicative of the detected actual attitude, for example an actual attitude angle. The inertial platform may be for instance based on the use of gyroscopes. The control unit 130 is also connected to a pressure sensing device 202, for instance a piezoelectric or a potentiometric transducer, installed on the space launcher and configured to measure the ambient static pressure and to send one or more (analogical or digital) exit signals carrying one or more quantities indicative of the measured ambient static pressure.

In particular, the control unit 130 is connected to the inertial platform 201 to receive one or more signals sent by the inertial platform 201, and therefore to receive one or more quantities indicative of the actual attitude of the launcher.

The control unit 130 is also configured to store or to calculate or to receive (for example, from a flight control system of the launcher) one or more quantities indicative of an attitude required for the space launcher, for example a required attitude angle. The control unit 130 is also connected to the pressure sensing device 202 to receive one or more signals sent by the pressure sensing device 202 and therefore to receive one or more quantities indicative of the measured ambient static pressure.

In detail, the control unit 130 is configured to control the linear actuators 120, conveniently by sending suitable control instructions for controlling the neutral angular position of the flaps. In particular, the control unit 130 is so configured as to make the flaps 110 take a neutral angular position where the flaps 110 are inclined, to the longitudinal axis of the rocket engine, at an inclination angle greater than, or equal to, the given angle of divergence. Moreover, the control unit 130 is so configured as to control the linear actuators 120 in such a manner as to control the neutral angular position taken by the flaps 110 according to the measured ambient static pressure and, therefore, to the flight height corresponding to the measured ambient static pressure.

The control unit 130 is also so configured as to control the linear actuators 120, by sending suitable control instructions for controlling the attitude of the launcher, so as to make one or more flaps 110 take an angular position different than the neutral angular position, according to the actual attitude of the space launcher and to the required attitude for the space launcher.

Preferably, the control means 130 are so configured as to control the neutral angular position taken by the flaps 110 by decreasing the inclination angle as the ambient static pressure decreases.

In some embodiments, the control unit 130 is so configured as: to reduce the inclination angle as the ambient static pressure decreases until said inclination angle corresponds to said angle of divergence of the nozzle; and then to keep the inclination angle equal to the given angle of divergence independently of the ambient static pressure.

In some embodiments the control unit 130 is so configured as:
  if the ambient static pressure is greater than a preset threshold, to decrease the inclination angle determining, for each new current value of the ambient static pressure, a corresponding current value of the inclination angle;
  if the ambient static pressure corresponds to the preset threshold, to make the inclination angle match the given angle of divergence of the nozzle;
  then, to keep said inclination angle equal to the given angle of divergence independently of the ambient static pressure.

Preferably, the control unit 130 is so configured as to make one or more of the flaps 110 take an angular position different than the neutral angular position by comparing the actual attitude of the space launcher and the attitude required for the space launcher, for instance, by checking if the actual attitude angle and the required attitude angle are equal to each other or if they differ more than a preset threshold. If the actual attitude and the required attitude differ (or differ more than a preset threshold), based on said actual attitude and said required attitude, the central control unit 130 can determine an angular position where one or more of the flaps deflect the supersonic gas flow exiting the exit section so as to bring the actual attitude towards the required attitude. Once this angular position of one or more flaps has been determined, the central unit 130 can control the actuators of the flap(s) in order to make them take the given angular position.

More in particular, according to advantageous embodiments, the control unit 130 may be configured so that, if the actual attitude of the launcher and the required attitude differ, the following steps are performed:

determining, based on said actual attitude and said required attitude, angular positions for a number M of said N flaps 110 (where N>M≥1), wherein said M flaps 110 deflect the supersonic gas flow exiting the nozzle so as to bring the actual attitude of the launcher towards the required attitude; and actuating the linear actuators 120 so as to make said M flaps 110 take the given angular positions.

As it is clearly apparent from the description above, the control of the position taken by the flaps 110, implemented by the control unit 130 through the linear actuators 120, have the double function of controlling the attitude of the launcher based on the actual attitude and the required attitude; and of controlling the neutral angular position, based on the ambient static pressure, i.e. on the flight level.

Moreover, FIG. 1 also shows a block 203 called "Dynamics of the launcher" in order to represent conceptually (in a clear way, known to those skilled in the art) the dynamic behavior of the space launcher resulting from the control of the position taken by the flaps 110 implemented by means of the control unit 130, so that the inertial platform 201 detects the actual attitude of the launcher resulting from said dynamic behavior.

Conveniently, when the launcher is at low flight heights, i.e. below a preset threshold height, the control unit 130 implements the type 1 operational mode and performs the control of both the attitude of the launcher and the neutral angular position, varying the neutral angular position as the ambient static pressure decreases, i.e. as the flight height increases, up to achieve a preset reference angular position corresponding to an inclination of the flaps 110, with respect to the longitudinal axis of the rocket engine, substantially equal to that of the given angle of divergence characterizing the exit section of the nozzle. This preset reference angular position is also associated with the preset ambient static pressure threshold corresponding to the above mentioned preset threshold height.

Conveniently, when the launcher is at high flight heights, i.e. above the preset threshold height, the control unit 130 implements the type 2 operational mode, and performs only the control of the attitude of the launcher, whilst, in the absence of attitude control commands, the flaps 110 are kept in the preset reference angular position.

In this regard it should be noted that the law based on which, in the type 1 operational mode, the neutral angular position of the flaps 110 is determined according to the ambient static pressure depends on the features of the specific fluid-dynamic field existing inside and outside the nozzle and can be therefore conveniently defined case by case based on CFD (computational fluid dynamics) simulations and/or experimental tests.

The control unit 130 may be configured so as to determine the neutral angular position of the N flaps 110, i.e. the inclination angle to the longitudinal axis of the rocket engine, by executing a first preset calculation function, or using a first preset lookup table, where values are stored of the inclination angle associated with respective height values, i.e. values of ambient static pressure.

In the same way, the control unit 130 can be conveniently configured to determine the angular positions of the flaps 110 for the attitude control by executing a second preset calculation function, or using a second preset lookup table.

In some embodiments, the control of the attitude of the launcher and that of the neutral angular position may be implemented by a single processing and control unit, as shown in FIG. 1, programmed through a suitable software and/or firmware. In other embodiments, two distinct units may be provided. A first unit is dedicated to controlling the attitude and is therefore suitably programmed to implement said attitude control based on the actual attitude of the launcher and on the required attitude. A second unit is dedicated to controlling the neutral angular position and is therefore suitably programmed to implement said control of the neutral angular position of the flaps 110 based on the ambient static pressure.

Figure 2:
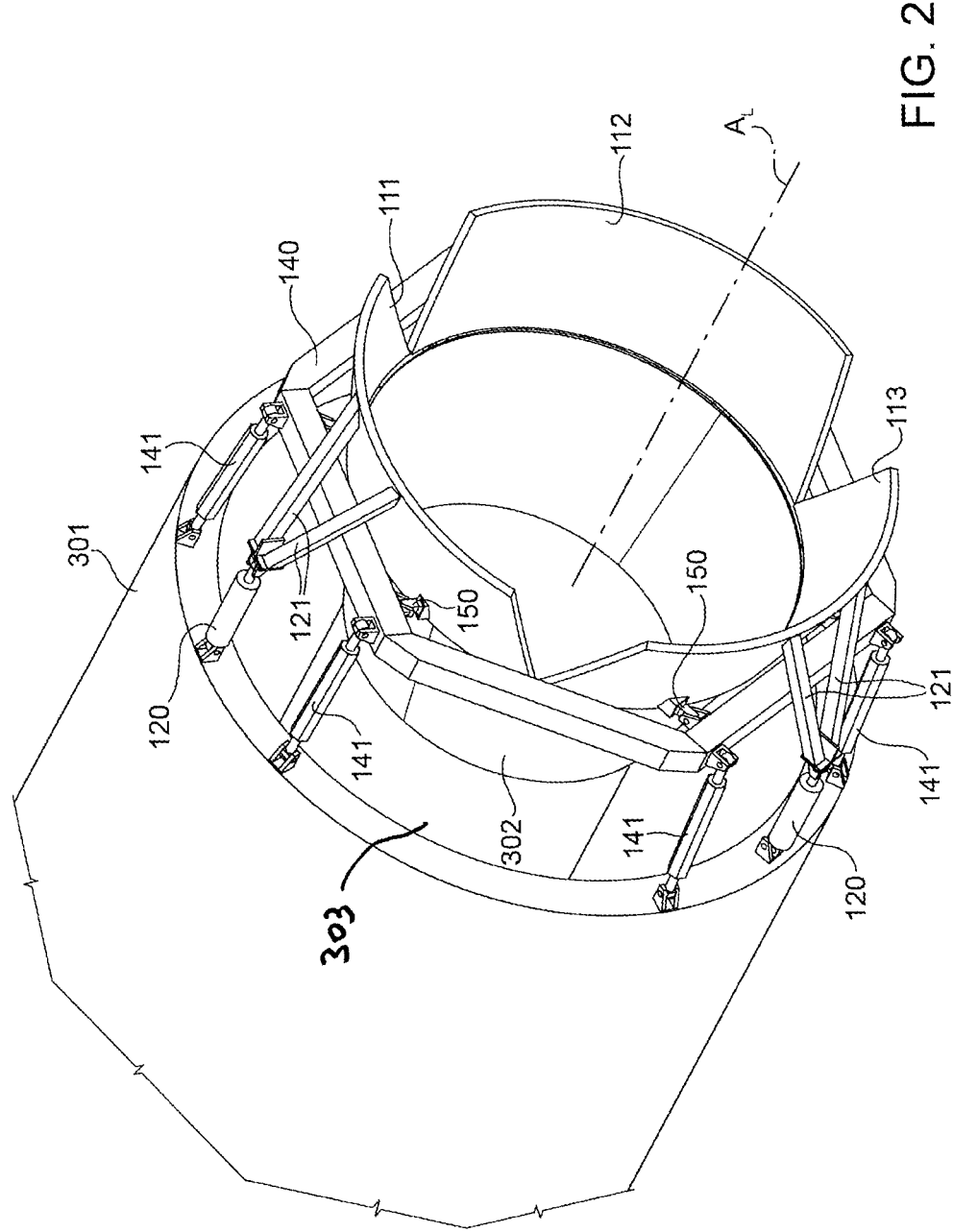
FIG. 2 shows an embodiment of flaps and respective linear actuators belonging to the attitude control and thrust boosting system of FIG. 1.

An exemplary embodiment of the flaps 110 and the linear actuators 120 is shown in FIG. 2. In particular, FIG. 2 is an axonometric view of a lower portion of a stage (for instance the first stage) of a multi-stage space launcher. The stage includes an outer structure 301 and a rocket engine provided with an exhaust nozzle. In FIG. 2 a divergent portion 302 of the exhaust nozzle is shown. 303 schematically indicates the rocket engine, the end part of which is shown, and which can be designed in a manner known to those skilled in the art. In particular, the rocket engine may be a solid-propellant rocket engine. In other embodiments the rocket engine may be a liquid-propellant rocket engine or also a hybrid-propellant rocket engine.

In the example of FIG. 2 the divergent portion 302 is substantially a truncated cone. The divergent portion 302 ends with an exit section from which, in use, the supersonic gas flow exits. Said exit section is characterized by a given angle of divergence with respect to a longitudinal axis $A_L$ of the rocket engine, i.e. a central symmetry axis of the exhaust nozzle and of the rocket engine.

In the example of FIG. 2 the flaps 110 are three jet flaps 111, 112, 113 having curved shape ideally forming an extension of the divergent shape of the divergent portion 302 of the nozzle. In other words, the flaps 111, 112, 113 are shaped so as to form an extension of the divergent portion 302.

The jet flaps 111, 112, 113 are arranged at 120° from one another in a plane orthogonal to the longitudinal axis $A_L$ of the rocket engine and are advantageously provided with a suitable thermal insulation, both on the inner surfaces and on the outer surfaces.

In some embodiments, the jet flaps 111, 112, 113 are hinged to a support structure 140 extending around the exit section of the divergent portion 302 of the nozzle substantially on a plane orthogonal to the axis $A_L$. In the example of FIG. 2 the support structure 140 is hexagonal. Also the support structure 140 is advantageously provided with a suitable thermal insulation of all the surfaces.

The support structure 140 is fixed to the outer structure 301 of the launcher stage, for example to an engine flange or an inter-stage flange, as in the case of FIG. 2, or to a so-called engine skirt. For example, the support structure 140 may be attached to the outer structure 301 by means of a plurality of support rods 141. In the example of FIG. 2, six hinged rods are provided that can be adjusted in length by means of worms at the eyelets at the respective ends thereof.

Each jet flap 111, 112, 113 can be connected to the support structure 140 by means of a respective pair of traditional hinges 150, as shown in the example of FIG. 2. Alternatively, and more conveniently, spherical joints may be used for rotating each jet flap 111, 112, 113.

Moreover, in the example of FIG. 2 three linear actuators 120 are used, one for each jet flap 111, 112, 113. Each linear actuator is connected, at a side, to a hinge fixed on the outer structure 301 of the launcher stage. At the other side, each linear actuator 120 is connected to a movable hinge integral with a pair of V-shaped joists for connecting to the respective jet flap 111, 112, 113.

In the example of FIG. 2, the connection structure between each jet flap 111, 112, 113 and the movable part of the respective linear actuator 120 is constituted by a pair of V-shaped joists 121, provided with suitable thermal insulation on all the surfaces, whose vertex is hinged to the movable part of the respective linear actuator 120, whilst the other two ends are integrally fixed to the outer surface of the respective jet flap 111, 112, 113.

It should be noted that the example shown in FIG. 2 is a non-limiting example. In fact, the support structure 140 could also have a different shape than the hexagonal shape and could be fixed to the outer structure 201 of the stage through support means different than the support rods 141, for example through support joists.

Moreover, the actuators 120 may be designed using different technologies. For example, electro-mechanical actuators can be used, or hydraulic actuators, pneumatic actuators etc., of the linear or rotary type or of any other type.

In any case, it should be noted that the support structure 140, on which the jet flaps 111, 112, 113 are hinged, practically avoids any mechanical interface between the nozzle and said jet flaps 111, 112, 113, that are therefore mechanically decoupled from the nozzle. In this way, in use, the jet flaps 111, 112, 113, the support structure 140 and therefore the outer structure 301 of the launcher stage are subjected to structural loads, but not the nozzle.

In the example of FIG. 2 the jet flaps 111, 112, 113 are in the reference angular position, i.e. the neutral angular position for high flight heights, where the jet flaps represent an extension of the exhaust nozzle of the rocket engine.

Figure 3:
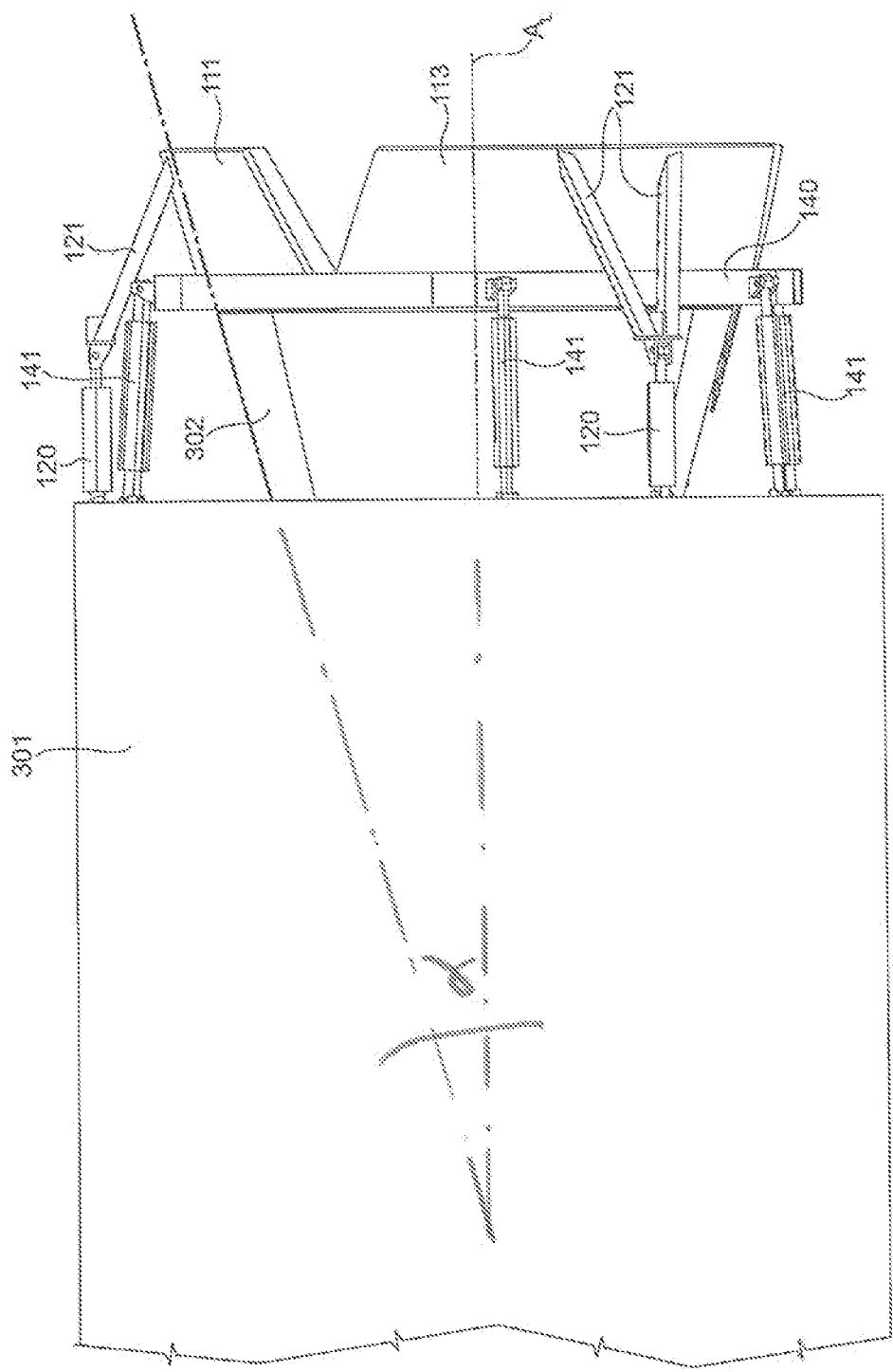
FIGS. 3, 4, 5 and 6 show different angular positions that the flaps of FIG. 2 can take.
Figure 4:
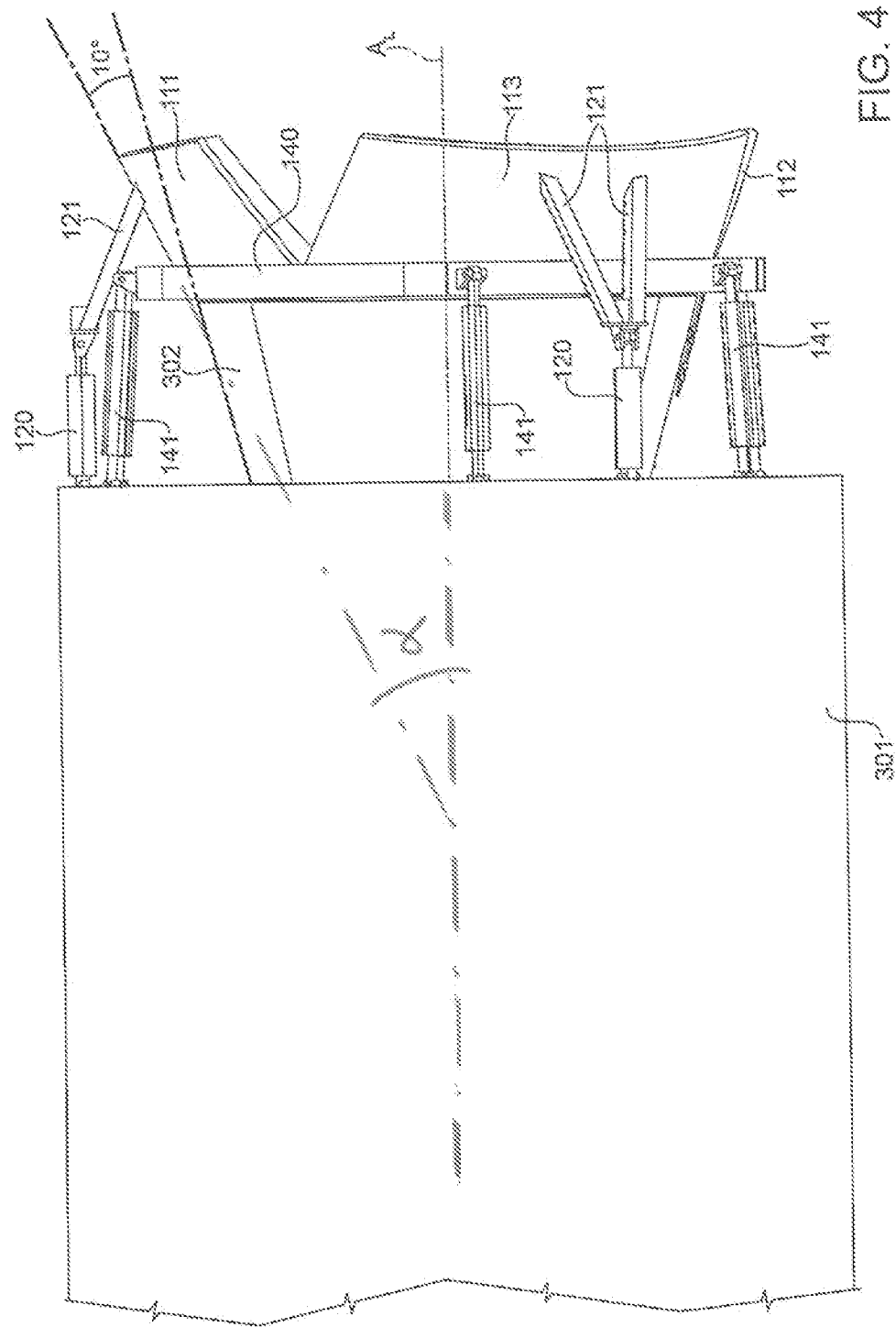
Figure 5:
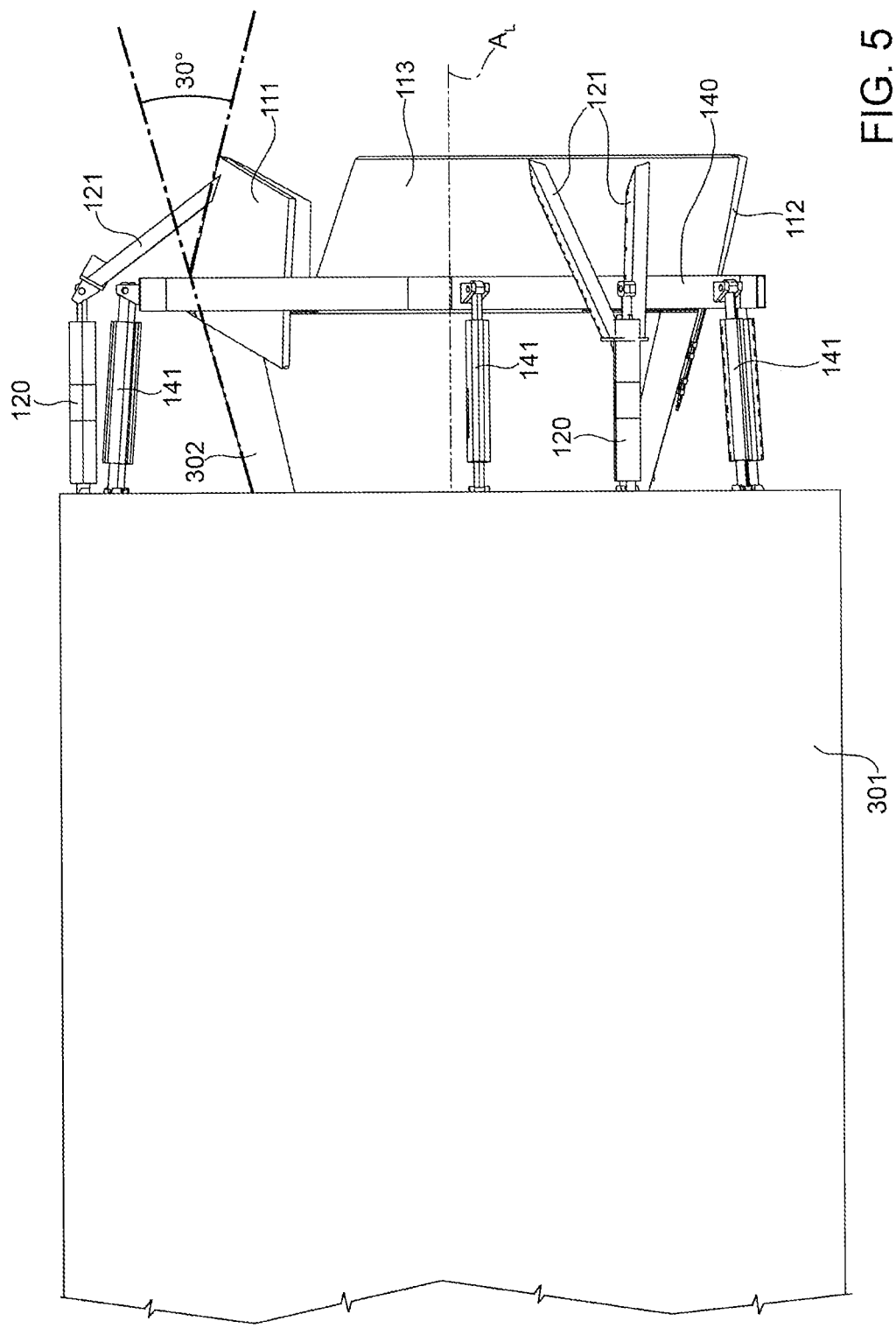
Figure 6:
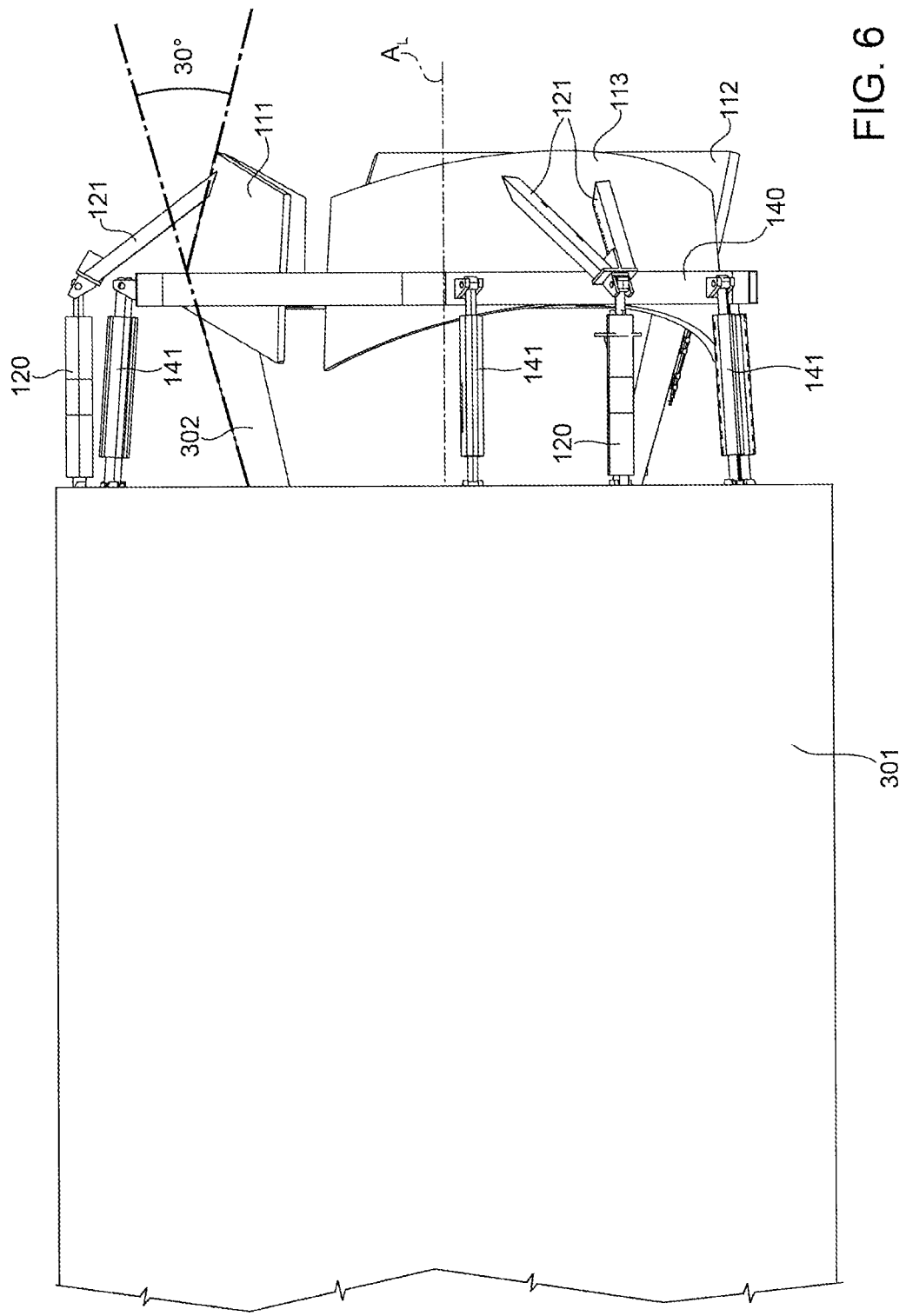

FIGS. 3, 4, 5 and 6 are side views of FIG. 2. In FIG. 3 the jet flaps 111, 112, 113 are in the reference angular position, i.e. in the neutral angular position for the high flight heights. In FIG. 4 the jet flaps 111, 112, 113 are deflected outwards by 10° with respect to the reference angular position. The attitude of the jet flaps 111, 112, 113 shown in FIG. 4 may be an example simply indicative of a possible neutral angular position at height zero. In FIG. 5 the jet flap 111 is deflected inwards by 30° with respect to the reference angular position, whilst the other flaps are in the angular position of FIG. 4. In FIG. 6 the jet flaps 111 and 113 are deflected inwards by 30° with respect to the reference angular position.

It should be understood that the attitudes of the jet flaps 111, 112, 113 shown in FIGS. 5 and 6 are examples indicative of two possible configurations that can be taken by the jet flaps 111, 112, 113 for controlling the attitude of the launcher.

It shall be noted that in FIGS. 3, 4, 5 and 6 dash-dot-lines represent the divergent profile of the divergent portion 302 of the nozzle at the jet flap 111, so as simply to illustrate the concept of reference angular position and to allow a better understanding of the alignment (FIG. 3), or of any deflection outwards (FIG. 4) or inwards (FIGS. 5 and 6) of said jet flap 111 with respect to the reference angular position.

In advantageous embodiments, in order to minimize the side leakages of gas through the gaps between jet flaps 111, 112, 113 and therefore to increase the efficiency of the system, inter-flap panels can be used arranged at said spaces.

Figure 7:
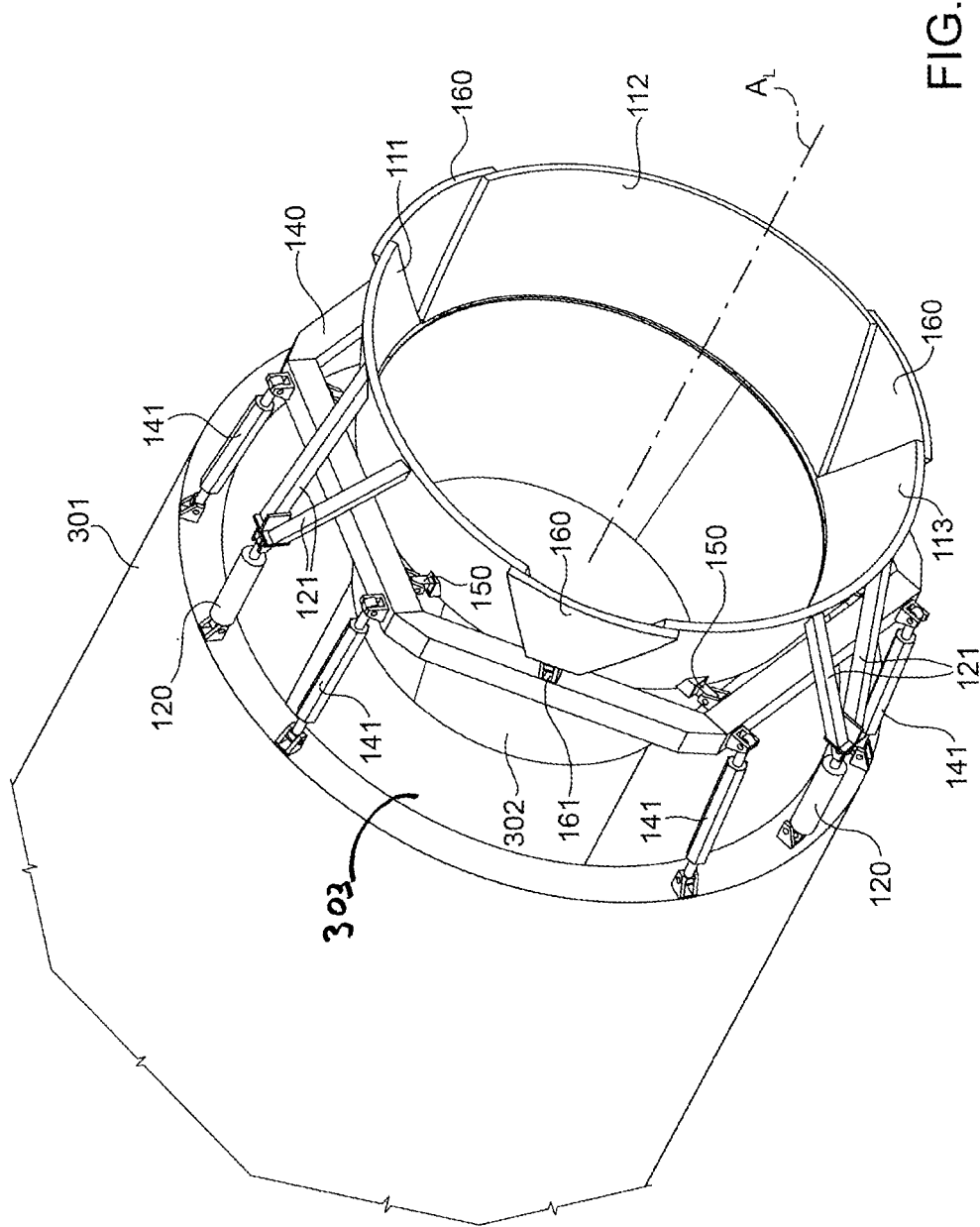
FIGS. 7 and 8 show a further embodiment of the present invention.
Figure 8:
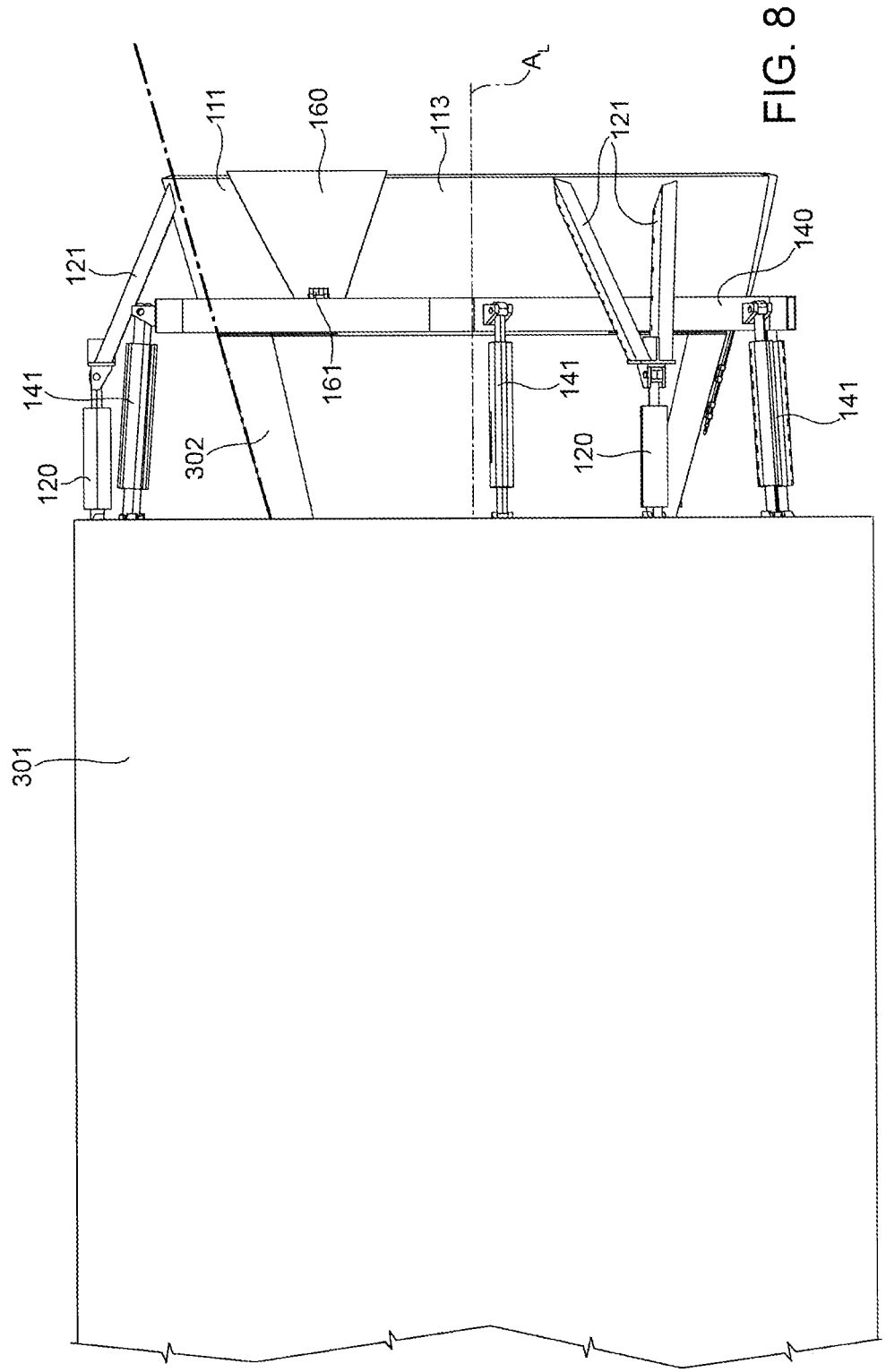

To this end, FIGS. 7 and 8 illustrate a second preferred non-limiting embodiment of the present invention, where the components of the attitude control and thrust boosting system 100 already shown in FIGS. 2, 3, 4, 5 and 6 and previously described are identified by the same reference numbers used in FIGS. 2-6 and will not be described again.

In particular, in the preferred embodiment of FIGS. 7 and 8 three inter-flap panels 160 are used, that are hinged to the support structure 140 at the gaps between the jet flaps 111, 112, 113. Resilient load members, for example springs, in particular helical springs, may be associated to the connection hinges between inter-flap panels 160 and support structure 140, to load resiliently the inter-flap panels. In this way, each inter-flap panel 160 interacts with the two flaps adjacent thereto as described below. If the two jet flaps adjacent to an inter-flap panel 160 are in the neutral angular position, the inter-flap panel 160 remains in contact with both said adjacent jet flaps. If one of the two adjacent jet flaps is in the neutral angular position whilst the other jet flap is deflected inwards for attitude control, the inter-flap panel 160 remains in contact with said jet flap that is in the neutral angular position. If both the adjacent jet flaps are deflected inwards for attitude control, the inter-flap panel 160 remains in contact with at least one of said adjacent jet flaps. Preferably, each inter-flap panel 160 is hinged to a respective hinge 161 constrained to the support structure 140 in correspondence of the gap between two respective adjacent jet flaps 111, 112, 113. Around the pin (not clearly shown in FIGS. 7 and 8) of said respective hinge 161 one or more springs are conveniently inserted, for instance torsion helical springs (not shown in FIGS. 7 and 8 for the sake of simplicity of drawing). The function of the springs is to generate on the inter-flap panel 160 a torque rotationally biasing the inter-flap panel towards the longitudinal axis $A_L$ of the rocket engine, and therefore to generate a pre-load through which the inter-flap panel rests on one or both the jet flaps 111, 112, 113 adjacent thereto.

The inter-flap panels 160 are conveniently provided with suitable thermal insulation and have curved shape adapted to the shape of the jet flaps 111, 112, 113. In the example illustrated in FIGS. 7 and 8, the plan projection of each inter-flap panel 160 is substantially an isosceles trapezoid.

It is clearly apparent from the description above that the present invention have many advantages, among which the following are worth mentioning:
elimination of the flexible joint in the nozzle of the solid-propellant rocket motors (SRM) or hybrid-propellant rocket engines (HRE), or elimination of the gimbal of the set nozzle/combustion chamber in the liquid-propellant rocket engines (LRE), as in the present invention the nozzle does not require to be deflected as in the traditional TVC systems, but is fixed, and the longitudinal axis thereof matches the engine longitudinal axis. Consequently, there is a decrease in costs and times for integrating/calibrating the nozzle on the engine;

absence of mechanical interfaces between the system of the present invention and the engine nozzle; in particular, the loads of the actuators on the engine nozzle are completely eliminated, with a consequent reduction of the mass and the unitary cost of the nozzle;

reduction of time and costs for integrating and calibrating the control system with the corresponding stage, thanks to the above mentioned absence of mechanical interfaces between the system of the present invention and the nozzle of the rocket engine;

boosting of the dynamic features of the system, resulting from the reduction, by at least one order of magnitude, of the rotation inertia, the load being constituted only by the jet flaps and not by the whole movable part of the nozzle;

thrust boosting (and therefore specific pulse boosting) at high flight heights, at which, thanks to the lower values of the ambient static pressure, the angular positioning of the jet flaps allows a virtual increase in the expansion ratio of the nozzle, without the issues arising from over-expansion of the supersonic flow of the nozzle that would occur at lower heights;

system of the invention is not affected by the negative phenomenon of the impulse load (already described above with reference to the conventional TVC systems), as the system of the invention is physically decoupled from the nozzle, whilst, on the other hand, this phenomenon does not have significant effects on the jet flaps, as, at the time of engine ignition, all these latter are in the position of maximal opening (maximal deflection outwards), and the interaction thereof with the gas flow exiting from the nozzle is therefore almost null or in any case negligible.

In FIG. 9 an example is illustrated of the possible thrust boosting of the first stage of a multi-stage space launcher as a function of the flight height thanks to the use of the present invention.

To better understand what illustrated in FIG. 9, the equation for calculating the thrust T of a rocket engine shall be taken into account:

$$T = \dot{m}V_e + A_e(P_e - P_a), \quad (1)$$

where $\dot{m}$ indicates the mass flow of the gases exiting from the nozzle, $V_e$ indicates the speed of the gases at the exit section of the nozzle, $A_e$ indicates the area of the exit section of the nozzle, $P_e$ indicates the static pressure of the gases at the exit section of the nozzle, and $P_a$ indicates the ambient static pressure depending on the flight level, i.e. $P_a = P_a(h)$, where h=flight height.

To better understand the meaning of the equation (1), it should be recalled that, as the expansion ratio of the nozzle varies, $V_e$ and $P_e$ vary in opposite manner (i.e. as one increases the other decreases and vice versa) and that, in any case, for a given value of ambient static pressure $P_a$ (where $P_a$ decreases as the flight height increases), the maximal thrust value is obtained at that specific expansion ratio for which $P_a = P_e$ (matching condition of the nozzle). On the contrary, if the expansion ratio of the nozzle increases behind the value of the matching condition, the phenomenon of over-expansion of the supersonic flow occurs, and in this condition the thrust and the specific impulse decrease in monotonic way as the expansion ratio increases, due to the formation (as mentioned above) of shock waves (that are as more intense as higher the over-expansion level is) and the consequent detachment of the limit layer from the inner walls of the divergent portion of the nozzle, wherein this latter event induces, beyond a given over-expansion level, an anomalous or irregular operation of the nozzle.

Therefore, with reference to FIG. 9, at low flight heights, the flaps 110 are deflected outwards with respect to the reference angular position, corresponding to the angle of divergence of the exit section of the nozzle. In this way it is possible to avoid the detachment of the limit layer from the inner walls of the divergent portion of the nozzle.

Once arrived at higher heights (typically in the order of 10/15 km), the flaps 110 are deflected to the reference angular position, thus practically extending the divergent portion of the nozzle and therefore increasing the expansion ratio thereof, without in this case incurring in the problems due to the over-expansion of the supersonic flow that would occur at lower heights, as mentioned above. Consequently, the increase in said expansion ratio of the nozzle entails a thrust and specific impulse boosting with respect to the case in which the invention is not used.

Figure 10A:
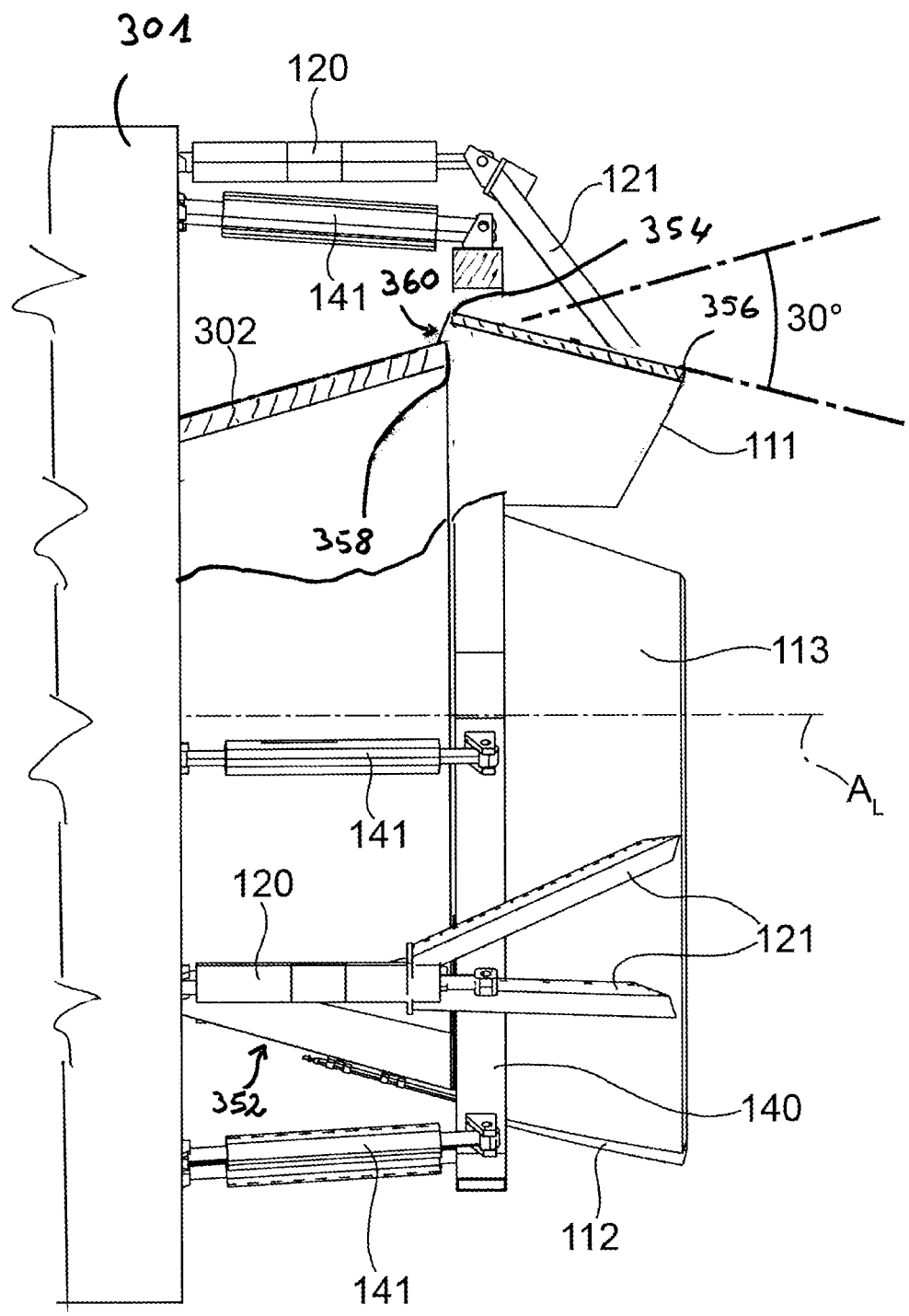
FIGS. 10A and 10B show an enlargement of a side view and partial cross-section of the exhaust nozzle and the flaps in two different angular positions of the flaps.
Figure 10B:
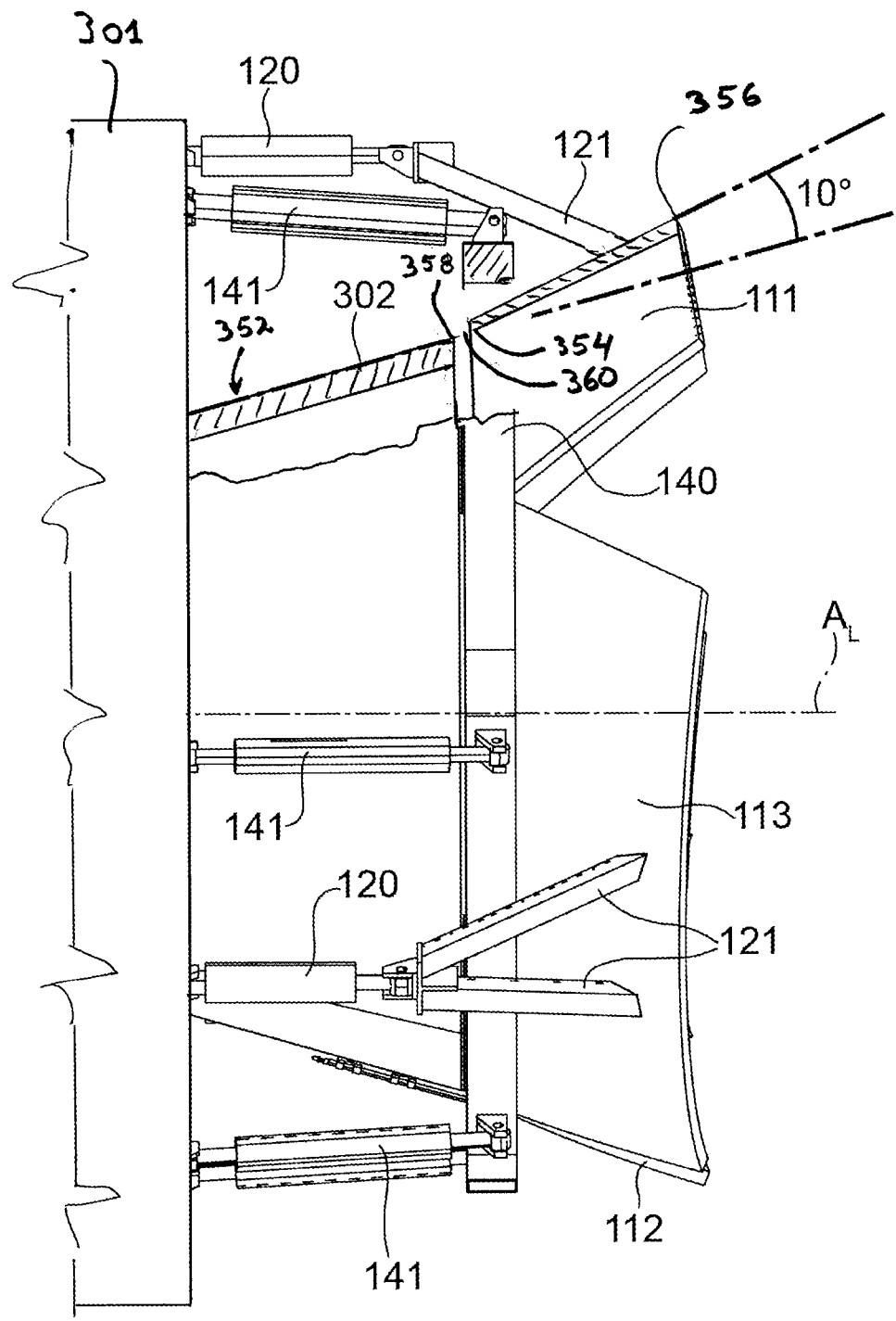

A further particular aspect of the structure of the exhaust nozzle and of the flaps is shown specifically in FIGS. 10A, 10B, 11 and 12, that will be described in detail below. More in particular FIGS. 10A and 10B show an enlarged detail of the rear part of the launcher, with the exhaust nozzle 352 and the flaps 111, 112, 113. The position of the flaps corresponds to that of FIGS. 4 and 5. In FIGS. 10A, 10B a part of the divergent portion 302 of the exhaust nozzle 352 and one of the flaps (flap 111) are shown in a cross-section according to a plane containing the longitudinal axis $A_L$ of the exhaust nozzle 352 and of the rocket engine 303.

Just by way of example, in FIG. 10A the flap 111 has a convergent angular position, whilst in FIG. 10B all the flaps 111, 112, 113 have a neutral angular position more divergent with respect to the opening angle of the divergent portion 302 of the exhaust nozzle 352.

In FIGS. 10A, 10B reference number 358 indicates the final edge or trailing edge of the divergent portion 302 of the exhaust nozzle 352, reference number 354 indicates the leading edge, or first edge, of the flaps and number 356 indicates the trailing edge of the flaps 111, 112, 113.

As can be clearly understood from FIGS. 10A and 10B, between the trailing edge 358 of the divergent portion 302 of the exhaust nozzle 352 and the leading edge 354 of each flap 111, 112, 113 a space or gap 360 is formed. As between the divergent portion 302 of the exhaust nozzle 352 and the flap 111, 112, 113 no sealing members are provided, the gap 360 connects the volume inside the arrangement formed by the divergent portion 302 of the exhaust nozzle 352 and the flaps 111, 112, 113 with the outer volume, i.e. with the surrounding space, where the launcher moves under the thrust of the rocket engine. Consequently, there is no sealing closure between the divergent portion 302 of the exhaust nozzle 352. In all the angular positions of the flaps 111, 112, 113 the opening or gap 360 is maintained, and its width is larger or smaller according to the angular position of the flaps.

Therefore, in particular when the angle of divergence of the flaps 111, 112, 113 is greater than the angle of divergence a (angle between the engine axis $A_L$ and the tangent to the exit section of the nozzle) of the divergent portion 302, as shown in particular in FIG. 10B, the low pressure of the exhaust gases inside the volume delimited by the divergent portion 302 and by the flaps 111, 112, 113 causes a suction of outer air, due to the so-called ejector effect. This flow of outer air sucked through the gap 360 by the exhaust gases of the rocket engine causes an increase in the static pressure on the inner wall of the flaps. This effect is obtained thanks to the geometry of the flaps 111, 112, 113 and of the divergent portion 302 of the exhaust nozzle 352, without the need for pressurized gas flows from turbo-machines inside the rocket engine, for example from the turbines of the turbo-pumps supplying the liquid propellant to the combustion chamber, as occurs in some prior art propulsion systems.

This is beneficial as the risk of flow detachment from the inner walls of the flaps is reduced also in solid-propellant rocket engines, where e separate gas flow, to be conveyed towards the coupling edge of the flaps, is not available (i.e. a flow not coming from the combustion chamber).

The air sucked from the outside thanks to the ejector effect through the gap 360 between each flap 111, 112, 113 and the divergent portion 302 has also the advantage of reducing the temperature on the inner wall of the flaps.

In FIGS. 10A, 10B the gap 360 is shown in a configuration without the inter-flap panels 160. However, it should be understood that the same arrangement and advantages can be obtained in the configuration with inter-flap panels 160 (as in FIGS. 7 and 8). FIGS. 11 and 12 show axonometric views of the end portion of the launcher taken from the side of the rocket engine, where the divergent portion 302 of the exhaust nozzle 352 and the arrangement of flaps 111, 112, 113 and of inter-flap panels 160 are shown, as well as the respective support structure 140. More in particular, in FIG. 11 the flaps 111, 112, 113 are arranged in a divergent position with respect to the exhaust nozzle 352. Vice versa, in FIG. 12 the flaps 111, 112, 113 are arranged as in FIG. 8, with the same inclination as the divergent portion 302 of the exhaust nozzle 352, and more precisely with the inclination of the tangent to the exhaust nozzle 352 at the trailing edge thereof. In both cases, the gap 360 is shown, formed between the trailing edge 358 of the exhaust nozzle 352 and the leading edge 354 of the flaps 111, 112, 113.

Here on the method for controlling the angular opening of the flaps 111, 112, 113, which has been described above in principle with reference to FIG. 1, is illustrated in greater detail. FIGS. 13A, 13B, 13C, 14 and 15 show block diagram schematizing the control method.

For each flap 111, 112, 113 the control algorithm comprises the two following distinct functions:
calculation of the target static pressure, i.e. of the desired static pressure, inside the trailing edge of the flap, indicated with $[P_S)_{FTE}]_{Target}$
calculation of the neutral angular position of the flap, indicated with $P_{DAP}$, corresponding to the value $[(P_S)_{FTE}]_{Target}$.

In some embodiments, the sensors used to obtain the input data for running the algorithm may comprise the following:
an ambient static pressure sensor. This sensor can be arranged in any suitable position on the space launcher, i.e. on the stage to which the rocket engine belongs, to which the flaps system to be controlled belongs;
pressure sensors, for example Pitot probes, able to measure both the static pressure and the total pressure, arranged on at the inner surface of each flap, at the trailing edge thereof;
static pressure sensors arranged on the entrance side of each flap, at the trailing edge thereof.

The input data required for the calculation of the desired static pressure, at the trailing edge of the flap, i.e. for the calculation of $[(P_S)_{FTE}]_{Target}$ are the following:
the measured ambient static pressure, indicated with $[(Ps)_{Amb}]_{Meas}$
the total inner pressure measured at the trailing edge of the flap and indicated with $[(P_T)_{FTE}]_{Meas}$
the inner static pressure measured at the trailing edge of the flap and indicated with $[(Ps)_{FTE}]_{Meas}$
the inner static temperature measured at the trailing edge of the flap and indicated with $[(Ts)_{FTE}]_{Meas}$ The input data for the calculation of the neutral angular position of the flap $\beta_{DAP}$ for the calculated value $[(P_S)_{FTE}]_{Target}$ are:
the static pressure measured inside the trailing edge of the flap and indicated with $[(Ps)_{FTE}]_{Meas}$
the calculated static pressure, i.e. the target static pressure inside the trailing edge of the flap and indicated with $[(P_S)_{FTE}]_{Target}$ The calculation of the target static pressure inside the trailing edge of the flap, i.e. of $[(P_S)_{FTE}]_{Target}$ requires, as a prerequisite, the prediction of the corresponding flow separation static pressure on the inner side of the trailing edge of the flap indicated with $(P_{SEP})_{FTE}$. The separation static pressure can be suitably determined by means of a criterion of flow separation for rocket nozzles, using for example: the ambient static pressure and the values of the local Mach number of the flow and/or of any other flow parameter required. Once the actual flow separation static pressure $(P_{SEP})_{FTE}$ has been obtained, it is possible to calculate the target static pressure by simply adding, to the value obtained from the calculation, a safety margin $(\Delta P_S)_{Margin}$ taking into account leakages, calculation uncertainties and other factors. Practically, therefore:

$$[(P_S)_{FTE}]_{Target} = (P_{SEP})_{FTE} + (\Delta P_S)_{Margin}$$

It should be taken into account that the value of the neutral angular position $\beta_{DAP}$ obtained through the above described calculation is generally different from flap to flap. However, as it is necessary to adopt the same angular position for all flaps 111, 112, 113, as angular position a position will be adopted, which is defined for example through one of the following criteria:
mean value between the values calculated for all flaps;
the highest of the values calculated for the flaps.

The value of the sound speed $\alpha$, for calculating the Mach number, is determined as follows:

$$\alpha = \sqrt{\gamma R (T_S)_{FTE}}$$

where $(T_S)_{FTE}$ is the static temperature (absolute temperature, i.e. in Kelvin degrees) of the gas at the trailing edge of the flap, $\gamma$ is the ratio of the specific heats at constant pressure and constant volume of the gas, R is the constant of the gas.

It should be taken into account that these parameters generally depend on the degree of mixing between combustion gas from the exhaust nozzle 352 and air sucked through the gap 360 at the leading edge of the flap 111, 112, 113. This can be taken into account by means of functions comprised in the algorithm, which take into account the following variables:
profile of the exhaust nozzle
expansion ratio
temperatures in the combustion chamber of the rocket engine
pressure in the combustion chamber of the rocket engine
mass flow of the exhaust gas
ambient static pressure $(Ps)_{Amb}$
deflection angle of the flaps.

The functions comprised in the algorithm can be determined experimentally and/or through Computational Fluid Dynamics (CFD) simulations.

Figure 13A:
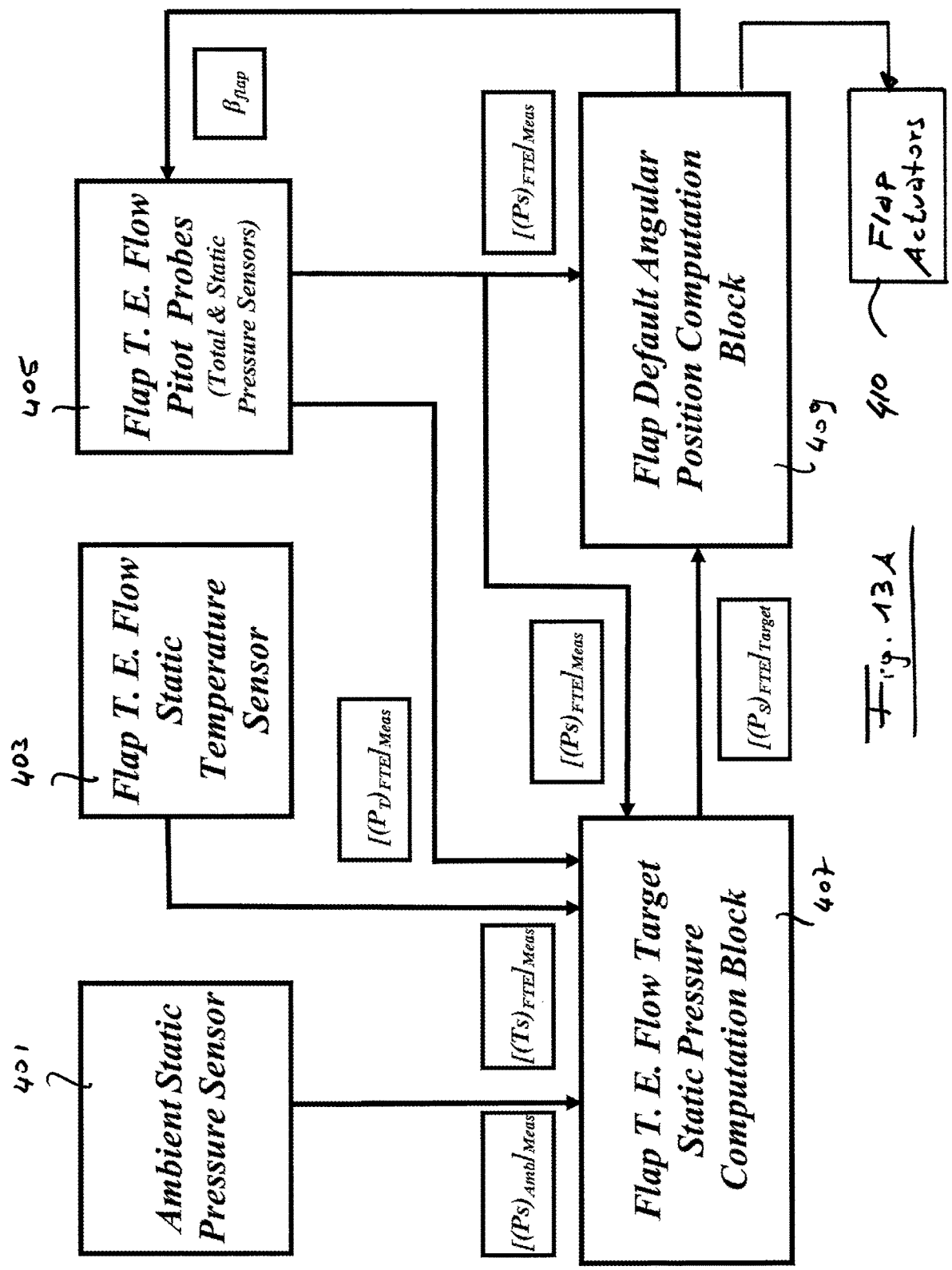
FIGS. 13A, 13B, 13C show a functional block diagram of an improved embodiment of the control system.
Figure 13B:
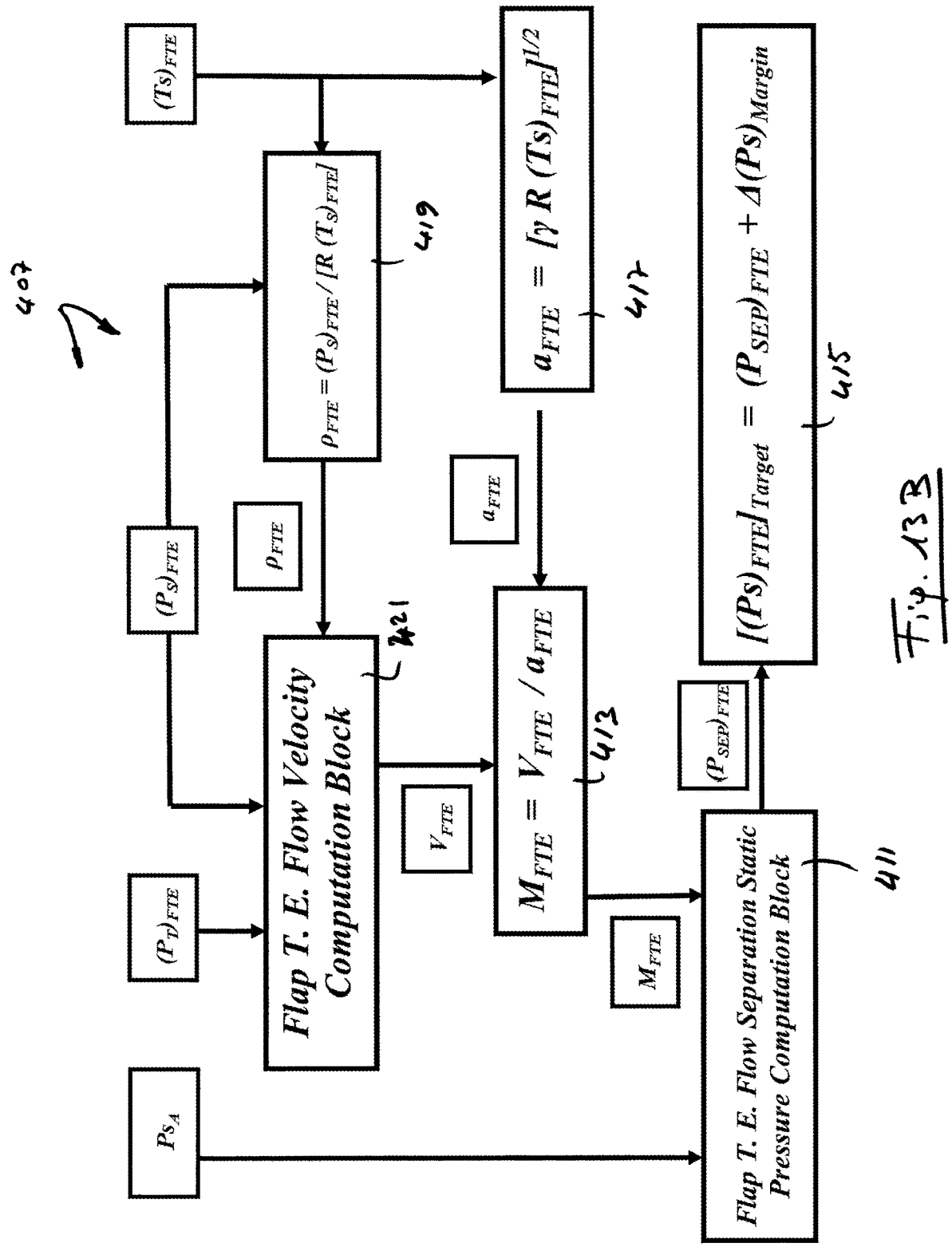
Figure 13C:
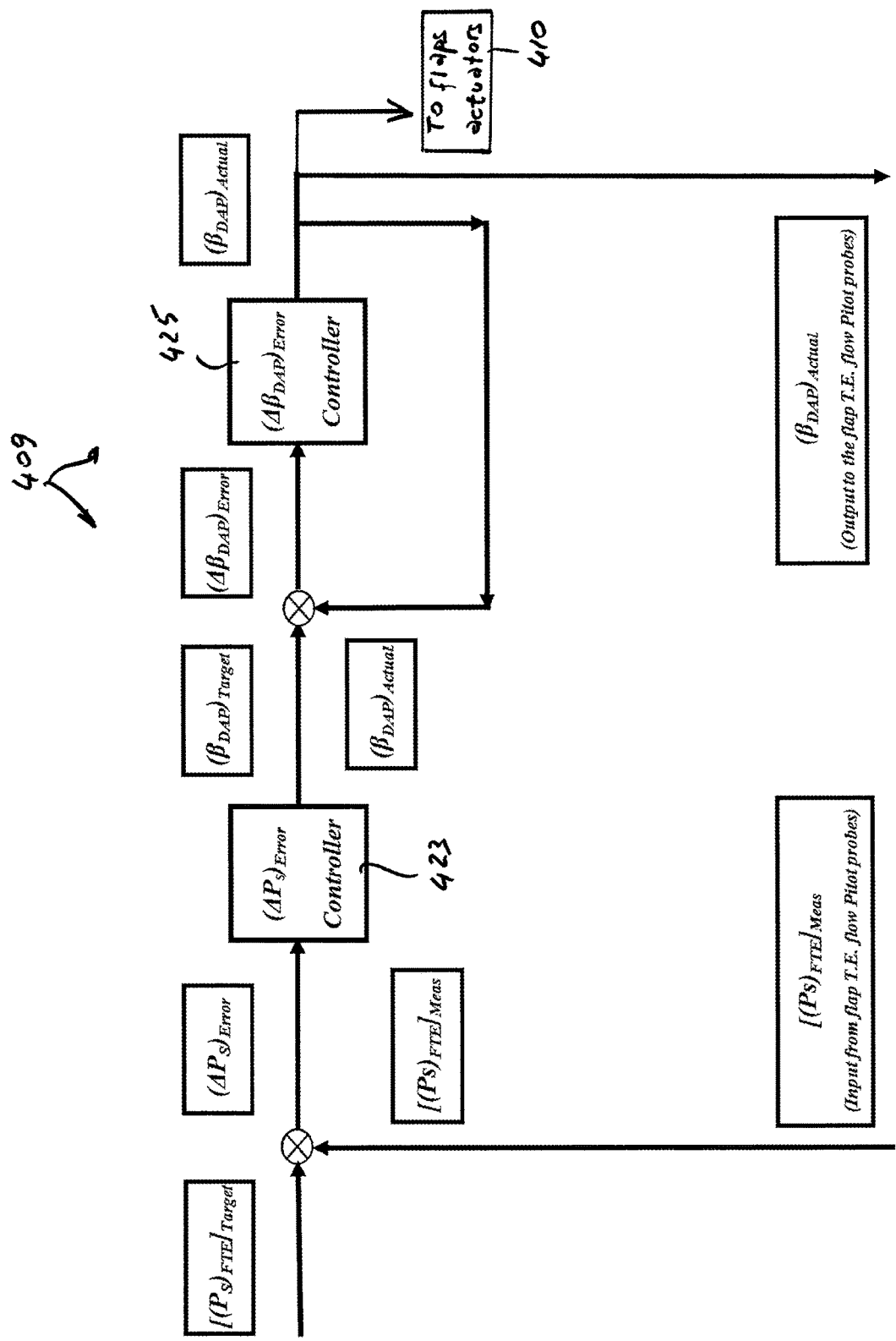

FIGS. 13A, 13B, 13C show a block diagram of the process for calculating the neutral angular position of the flaps with the algorithm summarized above. More in particular, FIG. 13A shows: an ambient static pressure sensor 401, a static pressure sensor on the trailing edge 403 of the flaps, a group of transducers of static and total pressure at the trailing edge of the flaps, for example Pitot probes, indicated as a whole with reference number 405. Reference number 407 indicates a block for calculating the target static pressure at the trailing edge of the flaps. Reference number 409 indicates a block for calculating the neutral angular position of the flaps. The block diagram of FIG. 13A shows, with the symbols indicated above, the measured and calculated parameters from the sensors and the calculation blocks.

In FIG. 13B the block 407 for calculating the flow separation static pressure at the trailing edge of the flaps is shown in greater detail. The input parameters are those indicated in FIG. 13A. For the sake of simplicity, the measured parameters are indicated with the same symbols used in FIG. 13A and in the description above, without the subscript "Meas". In FIG. 13B, reference number 411 indicates a block for calculating the flow separation static pressure at the trailing edge of the flaps $(P_{SEP})_{FTE}$. This block uses the measured ambient static pressure and the Mach number at the trailing edge of the flaps as input data. The output of the block 411 is used in the block 413 for calculating the target static pressure $[(P_S)_{FTE}]_{Target}$, by applying the safety margin $(\Delta P_S)_{margin}$. The Mach number, given by the ratio between the gas speed and the speed of sound at the trailing edge of the flaps, calculated by the block 413, requires to know the speed of the gas at the trailing edge of the flaps, indicated with $V_{FTE}$, calculated by a calculation block 421, based on measured parameters of static and total pressure at the trailing edge of the flaps, as well as based on the gas density—indicated with $\rho_{FTE}$—at the trailing edge of the flaps. This latter is calculated by a block 419 for calculating the density based on data on static pressure and static temperature measured at the trailing edge of the flaps. The parameter R in the block 419 is the constant of the gas flowing on the inner wall of the trailing edge of the flap. The speed of sound $a_{FTE}$ at the trailing edge of the flaps is calculated by a block 417 based on the static temperature measured at the trailing edge of the flaps and on the specific heats ratio γ and constant R of the gas.

FIG. 13C illustrates in greater detail the block 409 for calculating the neutral angular position of the flaps. This block calculates an error $(\Delta P_S)_{Error}$ between the target static pressure $[(P_S)_{FTE}]_{Target}$, i.e. the static pressure desired at the trailing edge of the flaps, and the measured static pressure $[(P_S)_{FTE}]_{Meas}$ at the trailing edge of the flaps. The error value calculated is applied to a controller 423 that determines the target neutral angular position $(R_{DAP})_{Target}$. This latter is compared with an actual angular position $(\beta_{DAP})_{Actual}$ coming from a feedback loop comprising a controller 425 generating the actual value of the angle, so that the angle of the flaps converges towards the target value $(\beta_{DAP})_{Target}$. The value obtained from the controller 425 is applied to the actuators of the flaps, as indicated by the block 410 in both FIG. 13A and FIG. 13C. In FIG. 13C a conceptual connection is also shown of the controller 425 with the pressure sensors (Pitot tubes) determining the static pressure and the total pressure at the trailing edge of the flaps. This conceptual connection substantially indicates that by varying the angle of the flaps, the pressure values recorded by the Pitot tubes at the trailing edges of the flaps also vary.

Figure 14:
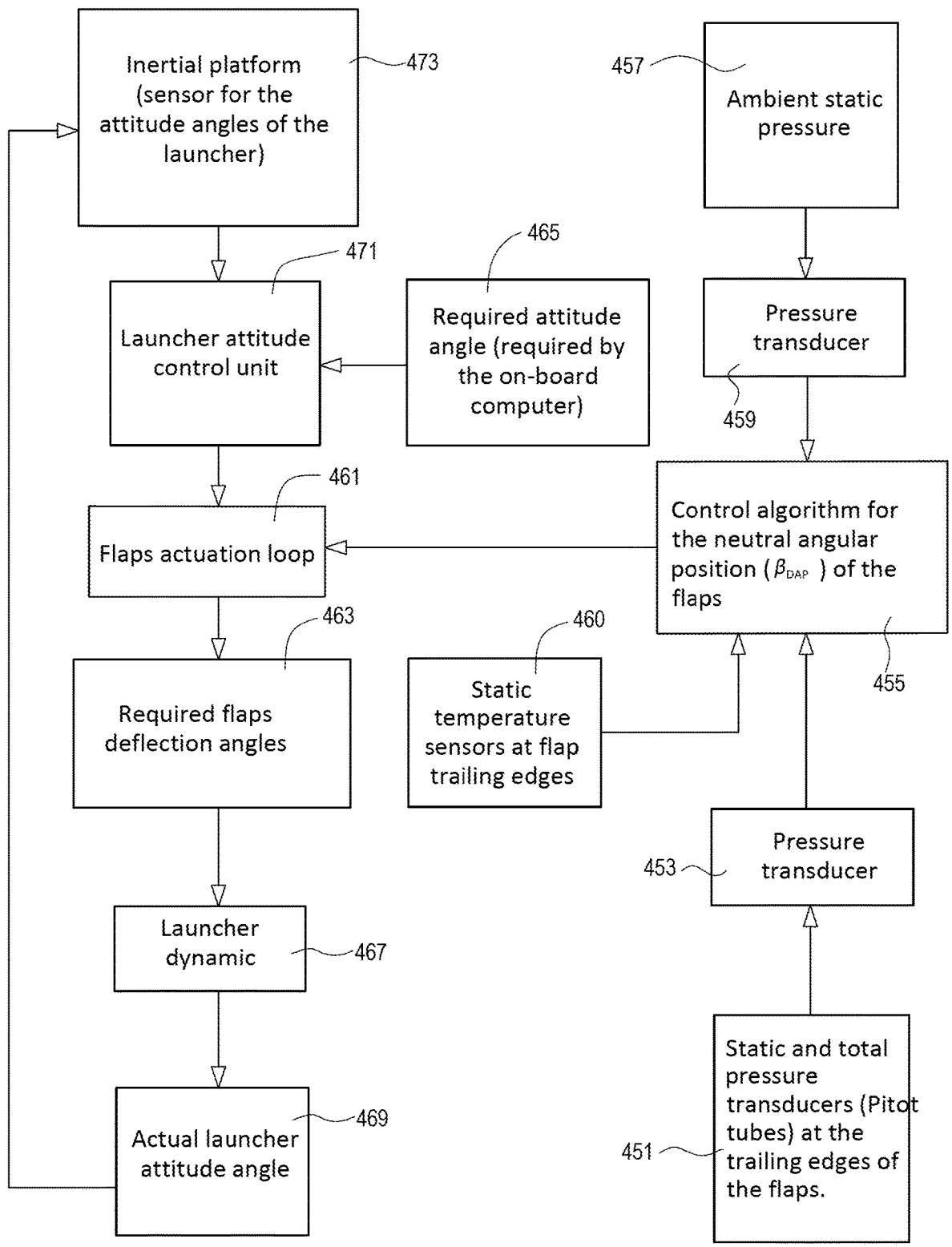
FIG. 14, analogously to FIG. 1, schematically shows an attitude control and thrust boosting system according to an embodiment of the present invention, and the respective operation logics.

The block diagram of FIG. 14 represents, similarly to FIG. 1 but in greater detail, the control system as a whole. More in particular, in FIG. 14 the following blocks are shown: a block 451 indicative of the sensors of static and total pressure at the trailing edge of the flaps 111, 112, 113; a block 453 representing the pressure transducers connected to the sensors of the block 451; a block 455 executing the above described algorithm for calculating the neutral angular position of the flaps $(\beta_{DAP})$; a block 457 representing the ambient static pressure sensor; a block 459 representing the pressure transducer associated with the ambient static pressure sensor; a block 460 representing a flow static temperature sensor at the trailing edge of the flaps; a block 461 representing the actuation loop of the flaps 111, 112, 113; a block 463 representing the deflection angles required for the flaps, imparted by the actuators of the block 461; a block 465 determining the required attitude angle for the launcher, based on the guide function exerted by the on-board computer of the launcher; the block 467 representing the launcher dynamics; the block 469 representing the actual attitude angle of the launcher; the block 471 representing the control unit for controlling the attitude of the launcher; and the block 473 representing the inertial platform and the sensors thereof determining the actual, or current, attitude angle of the launcher.

The set of blocks in FIG. 14 execute the control of the neutral angular position of the flaps according to the algorithm described with reference to FIGS. 13A, 13B, 13C and the control of the attitude of the launcher, sending commands to the actuators of the flaps 111, 112, 113 (block 461). Summarizing, the blocks 451, 453, 457, 459, 460 give the algorithm executed by the block 455 the parameters necessary for calculating the neutral position of the flaps 111, 112, 113. The block 455 is therefore functionally connected to the block 463 representing the actuation loop of the flaps. The inertial platform represented by the block 473 provides data on the measurement of the actual attitude of the launcher, and the block 465 provides information on the target attitude of the launcher. Through the control unit for controlling the attitude of the launcher (block 471) the signals are given to the actuators of the flaps in the block 461 that cause the actuation of the flaps to modify the attitude of the launcher. From the block 469 the inertial platform 473 executes the measurement of the current (actual) attitude of the launcher following changes to the attitude obtained through the flaps.

The attitude control is practically performed as follows. The inertial platform 473 measures the attitude angles of the launcher and more precisely the pitch angle and the yaw angle. The on-board computer (block 465) compares the measured attitude angles and the target ones and sends to the attitude control unit 471 the target deflection values for the various flaps (three in the illustrated example). These angles take into account the neutral angular position calculated according to the flight height (FIGS. 13A-13C). Based on the signals form the block 471 the actuation loop acts on the actuators of the flaps modifying the angular position of each flap independently of the other flaps, as required, so as to generate the torque necessary to the launcher to achieve the target attitude.

The invention has been described with reference to various embodiments; however, it will be clearly apparent to those skilled in the art that modifications, variants and omissions can be done to the invention, without however departing from the scope of protection thereof as claimed in the attached claims. Furthermore, if not otherwise stated, the order or sequence of any step of method or process may be changed according to alternative embodiments.

The invention claimed is:

1. An attitude control and thrust boosting system for a space launcher, wherein said space launcher is equipped with a rocket engine provided with an exhaust nozzle, wherein said exhaust nozzle comprises a divergent portion configured to make a supersonic gas flow exit through an exit section defined by a given angle of divergence with respect to a longitudinal axis of the rocket engine, the attitude control and thrust boosting system comprising:
a plurality of flaps arranged around the exit section, the plurality of flaps being shaped so as to extend the divergent portion of the exhaust nozzle, mechanically decoupled from said exhaust nozzle and which can be actuated to take different angular positions with respect to the longitudinal axis of the rocket engine; and
a control means configured to:
receive quantities indicative of an actual attitude of the space launcher and an ambient static pressure;
cause the plurality of flaps to take a neutral angular position where the plurality of flaps are inclined, with respect to the longitudinal axis of the rocket engine, according to an inclination angle greater than, or equal to, the given angle of divergence;
control the neutral angular position taken by the plurality of flaps according to the ambient static pressure by reducing the inclination angle as the ambient static pressure decreases; and
make one or more of the plurality of flaps take an angular position different than the neutral angular position according to the actual attitude of the space launcher and to a required attitude for said space launcher.

2. The system of claim 1, wherein the control means is further configured to:
reduce the inclination angle as the ambient static pressure decreases up to make said inclination angle match the given angle of divergence;
then, keep said inclination angle equal to the given angle of divergence independently of the ambient static pressure.

3. The system of claim 2, wherein the control means is further configured to:
if the ambient static pressure is greater than a preset threshold, decrease the inclination angle while determining, for each new current value of the ambient static pressure, a corresponding current value of the inclination angle so as not to produce over-expansion of the supersonic flow;
if the ambient static pressure corresponds to the preset threshold, make the inclination angle match the given angle of divergence;
then, keep said inclination angle equal to the given angle of divergence independently of the ambient static pressure.

4. The system of claim 1, wherein the control means is further configured to make one of the plurality of flaps take an angular position different than the neutral angular position:
by comparing the actual attitude of the space launcher and the required attitude for said space launcher; and,
in case the actual attitude differs from the required attitude,
by determining, based on said actual attitude and said required attitude, an angular position where said flap deflects the supersonic gas flow exiting from the exit section so as to bring the actual attitude towards the required attitude and
by making said flap take the given angular position.

5. The system of claim 1, wherein the control means is connected to:
an inertial platform installed on the space launcher and configured to detect the actual attitude of said space launcher; and a pressure sensing device installed on the space launcher and configured to measure the ambient static pressure.

6. The system of claim 1, wherein the control means is further configured to determine, to receive or to store one or more quantities indicative of the required attitude of the space launcher.

7. The system of claim 1, wherein the plurality of flaps are hinged to a support structure that is constrained to an outer structure of the space launcher, is arranged at the exit section and extends around said exit section, wherein said plurality of flaps are hinged to said support structure that said plurality of flaps can be actuated in order to take different angular positions with respect to the longitudinal axis of the rocket engine.

8. The system of claim 7, further comprising a plurality of inter-flap panels, each of said plurality of inter-flap panels being hinged to the support structure at a gap between two respective adjacent flaps of said plurality of flaps and each of said plurality of inter-flap panels is configured to remain always in contact with at least one of said respective adjacent flaps.

9. The system of claim 1, further comprising a plurality of actuators fixed to an outer structure of the space launcher, said plurality of actuators being coupled to the plurality of flaps and said plurality of actuators being operable to make said plurality of flaps take different angular positions with respect to the longitudinal axis of the rocket engine, said plurality of actuators being connected to the control means to be actuated by said control means.

10. The system of claim 1, wherein the exit section lies on a plane perpendicular to the longitudinal axis of the rocket engine, and said longitudinal axis of the rocket engine is a central axis of symmetry of the exhaust nozzle and of the rocket engine.

11. A space launcher, comprising:
a rocket engine provided with an exhaust nozzle, wherein said exhaust nozzle comprises a divergent portion configured to make a supersonic gas flow exit through an exit section defined by a given angle of divergence with respect to a longitudinal axis of the rocket engine;
an attitude control and thrust boosting system comprising:
a plurality of flaps arranged around the exit section, shaped so as to extend the divergent portion of the exhaust nozzle, mechanically decoupled from said exhaust nozzle and which can be actuated to take different angular positions with respect to the longitudinal axis of the rocket engine; and
a control means configured to:
receive quantities indicative of an actual attitude of the space launcher and an ambient static pressure;
cause the flaps to take a neutral angular position where the plurality of flaps are inclined, with respect to the longitudinal axis of the rocket engine, according to an inclination angle greater than, or equal to, the given angle of divergence;
control the neutral angular position taken by the plurality of flaps according to the ambient static pressure by reducing the inclination angle as the ambient static pressure decreases; and
make one or more of said plurality of flaps take an angular position different than the neutral angular position according to the actual attitude of the space launcher and to a required attitude for said space launcher.

12. A stage of a multi-stage space launcher, the stage comprising:

a rocket engine provided with an exhaust nozzle, wherein said exhaust nozzle comprises a divergent portion configured to make a supersonic gas flow exit through an exit section defined by a given angle of divergence with respect to a longitudinal axis of the rocket engine;

an attitude control and thrust boosting system comprising:
  a plurality of flaps arranged around the exit section, shaped so as to extend the divergent portion of the exhaust nozzle, mechanically decoupled from said exhaust nozzle and which can be actuated to take different angular positions with respect to the longitudinal axis of the rocket engine; and
  a control means configured to:
    receive quantities indicative of an actual attitude of the space launcher and an ambient static pressure;
    cause the plurality of flaps to take a neutral angular position where the plurality of flaps are inclined, with respect to the longitudinal axis of the rocket engine, according to an inclination angle greater than, or equal to, the given angle of divergence;
    control the neutral angular position taken by the plurality of flaps according to the ambient static pressure by reducing the inclination angle as the ambient static pressure decreases, and
    make one or more of the plurality of flaps take an angular position different than the neutral angular position according to the actual attitude of the space launcher and to a required attitude for said space launcher.

13. An attitude control and thrust boosting method for a space launcher equipped with a rocket engine provided with an exhaust nozzle having a divergent portion configured to make a supersonic gas flow exit through an exit section thereof defined by a given angle of divergence with respect to a longitudinal axis of the rocket engine, the attitude control and thrust boosting method comprising the following steps:
  receiving quantities indicative of an actual attitude of the space launcher and of an ambient static pressure;
  making a plurality of flaps, arranged around the exit section of the nozzle and shaped so as to extend the divergent portion of the nozzle, take a neutral angular position, where the flaps are inclined, with respect to the longitudinal axis of the rocket engine, according to an inclination angle equal to, or greater than, the given angle of divergence;
  controlling the neutral angular position taken by the plurality of flaps according to the ambient static pressure by reducing the inclination angle of the plurality of flaps as the ambient static pressure decreases.

14. The method of claim 13, further comprising the step of making one or more of the plurality of flaps take an angular position different than the neutral angular position according to the actual attitude of the space launcher and to a required attitude of said space launcher.

15. The method of claim 14, further comprising the steps of:
  reducing the inclination angle of the plurality of flaps as the ambient static pressure decreases up to make said inclination angle match the given angle of divergence;
  then, keeping said inclination angle equal to the given angle of divergence independently of the ambient static pressure.

16. The method of claim 15, further comprising the steps of:
  if the ambient static pressure is greater than a preset threshold, decreasing the inclination angle determining, for each new current value of the ambient static pressure, a corresponding current value of the inclination angle so as not to produce over-expansion of the supersonic flow;
  if the ambient static pressure corresponds to the preset threshold, making the inclination angle match the given angle of divergence;
  then, keeping said inclination angle equal to the given angle of divergence independently of the ambient static pressure.

17. The method of claim 13, further comprising the steps of:
  comparing an actual attitude of the space launcher and a required attitude for said space launcher; and,
  in case the actual attitude differs from the required attitude,
    determining, based on said actual attitude and said required attitude, an angular position where at least one of said plurality of flaps deflects the supersonic gas flow exiting from the exit section so as to bring the actual attitude towards the required attitude; and
    making said at least one of said plurality of flaps take the given angular position.

18. A thrust device for a space launcher, the thrust device comprising:
  an exhaust nozzle having a divergent portion able to make a supersonic gas flow exit through an exit section defined by a given angle of divergence with respect to a longitudinal axis of the exhaust nozzle;
  a plurality of flaps, arranged around the exit section, wherein said plurality of flaps are shaped so as to extend the divergent portion of the exhaust nozzle, are mechanically decoupled from said exhaust nozzle and said plurality of flaps are operable to take different angular positions with respect to the longitudinal axis of the exhaust nozzle, wherein the plurality of flaps are hinged to a support structure, configured to be constrained to an outer structure of the space launcher, wherein the support structure is provided at the exit section of the exhaust nozzle and extends around said exit section, wherein said plurality of flaps are hinged to the support structure so that said plurality of flaps can be actuated in order to take different angular positions with respect to the longitudinal axis of the exhaust nozzle, wherein each of said plurality of flaps is associated with a respective actuator, wherein the plurality of flaps are arranged aligned with one another on a single level without overlapping one another, forming a gap between each pair of adjacent flaps, wherein a plurality of inter-flap panels are provided, each of plurality of inter-flap panels being hinged to the support structure at the gap between two respective flaps and each of said plurality of inter-flap panels is passively biased so as to remain in contact with at least one of the respective flaps between which said gap is formed; and
  a control means configured to:
    receive quantities indicative of an actual attitude of the space launcher and an ambient static pressure;
    cause the plurality of flaps to take a neutral angular position where the plurality of flaps are inclined, with respect to the longitudinal axis of the rocket engine, according to an inclination angle greater than, or equal to, the given angle of divergence;
    control the neutral angular position taken by the plurality of flaps according to the ambient static pressure by reducing the inclination angle as the ambient static pressure decreases; and make one or more of the plurality of flaps take an angular position different than the neutral angular position according to the actual attitude of the space launcher and to a required attitude for said space launcher.

19. The device of claim 18, further comprising a resilient pre-load member for each of the inter-flap panels, the resilient pre-load member being adapted to push one of the inter-flap panels to rest on at least one of the adjacent flaps.

20. The device of claim 18, wherein the exhaust nozzle and the plurality of flaps are arranged so that, in at least some angular positions of the plurality of flaps between a trailing edge of the divergent portion of the exhaust nozzle and a leading edge of each of the plurality of flaps a gap is formed which places an inner volume defined by the exhaust nozzle and the plurality of flaps in communication with a space outside the exhaust nozzle and the plurality of flaps, said gap being so configured that in at least one angular position of the plurality of flaps the flow of gas exhausted from the nozzle generates suction of outer air.

21. The device of claim 18, wherein between a trailing edge of the divergent portion of the exhaust nozzle and the leading edge of each of the plurality of flaps a gap is formed, wherein the volume in an interior of the arrangement formed by the divergent portion of the exhaust nozzle and the plurality of flaps are in fluid communication with the surrounding environment via the gap, where the space launcher moves under the thrust of the thrust device.

* * * * *